(12) United States Patent
Matthews et al.

(10) Patent No.: US 12,432,154 B1
(45) Date of Patent: Sep. 30, 2025

(54) MACsec ARCHITECTURE

(71) Applicant: Marvell Asia Pte Ltd, Singapore (SG)

(72) Inventors: William Brad Matthews, Los Gatos, CA (US); Meg Lin, Saratoga, CA (US); Puneet Agarwal, Santa Clara, CA (US)

(73) Assignee: Marvell Asia Pte Ltd, Singapore (SG)

( * ) Notice: Subject to any disclaimer, the term of this patent is extended or adjusted under 35 U.S.C. 154(b) by 389 days.

(21) Appl. No.: 17/947,150

(22) Filed: Sep. 18, 2022

(51) Int. Cl.
*H04L 47/30* (2022.01)
*H04L 9/40* (2022.01)
(52) U.S. Cl.
CPC .......... *H04L 47/30* (2013.01); *H04L 63/0485* (2013.01)
(58) Field of Classification Search
CPC .......................... H04L 47/30; H04L 63/0485
See application file for complete search history.

(56) References Cited

U.S. PATENT DOCUMENTS

| | | | | |
|---|---|---|---|---|
| 7,826,360 B1* | 11/2010 | Hutchison | ........... | H04L 63/0428 370/254 |
| 2011/0164496 A1* | 7/2011 | Loh | .......... | H04L 47/10 370/230 |
| 2020/0127983 A1* | 4/2020 | Asghar | ................. | H04L 9/0819 |
| 2022/0385590 A1* | 12/2022 | Haramaty | ............. | H04L 63/164 |

* cited by examiner

*Primary Examiner* — Glenton B Burgess
*Assistant Examiner* — Patrick F Ngankam
(74) *Attorney, Agent, or Firm* — Shield Intellectual Property PC; Kirk D. Wong

(57) ABSTRACT

A Media Access Control Security (MACsec) core architecture implements flow control and bandwidth management when bandwidth is expanded internally due to encryption overhead and packet injection. External flow control requests are merged with internal flow control states and sent to a connected host.

20 Claims, 6 Drawing Sheets

MACsec ARCHITECTURE

TECHNICAL FIELD

Embodiments relate generally to computer networking, and, more specifically, to techniques for increasing the efficiency of communications between network devices.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A computer network is a set of computing components interconnected by communication links. Each computing component may be a separate computing device, such as, without limitation, a hub, switch, bridge, router, server, gateway, or personal computer, or a component thereof. Each computing component, or "network device," is considered to be a node within the network. A communication link is a mechanism of connecting at least two nodes such that each node may transmit data to and receive data from the other node. Such data may be transmitted in the form of signals over transmission media such as, without limitation, electrical cables, optical cables, or wireless media.

The structure and transmission of data between nodes is governed by a number of different protocols. There may be multiple layers of protocols, typically beginning with a lowest layer, such as a "physical" layer that governs the transmission and reception of raw bit streams as signals over a transmission medium. Each layer defines a data unit (the protocol data unit, or "PDU"), with multiple data units at one layer typically combining to form a single data unit in another. Additional examples of layers may include, for instance, a data link layer in which bits defined by a physical layer are combined to form a frame or cell, a network layer in which frames or cells defined by the data link layer are combined to form a packet, and a transport layer in which packets defined by the network layer are combined to form a TCP segment or UDP datagram. The Open Systems Interconnection model of communications describes these and other layers of communications.

Media Access Control Security (MACsec) is a data link layer or layer 2 security encryption scheme that provides point-to-point security on Ethernet links by adding encryption at layer 2 of a wired Ethernet network. MACsec is defined by IEEE standard 802.1AE. Encryption typically occurs at higher layers, for example at layer 3 IP, layer 4 TCP and UDP. At layer 2, frames are not encrypted. This leaves open security issues such that frames being passed between switches may be collected using a wiretap between the switches. MACsec adds security at level 2 that prevents wiring tapping, replay attacks, man-in-the-middle attacks, etc. MACsec also includes security features such as Internet Protocol Security (IPSec) and Advanced Encryption Standard (AES).

BRIEF DESCRIPTION OF THE DRAWINGS

The present inventive subject matter is illustrated by way of example, and not by way of limitation, in the figures of the accompanying drawings and in which like reference numerals refer to similar elements and in which.

DETAILED DESCRIPTION

Figure 1:
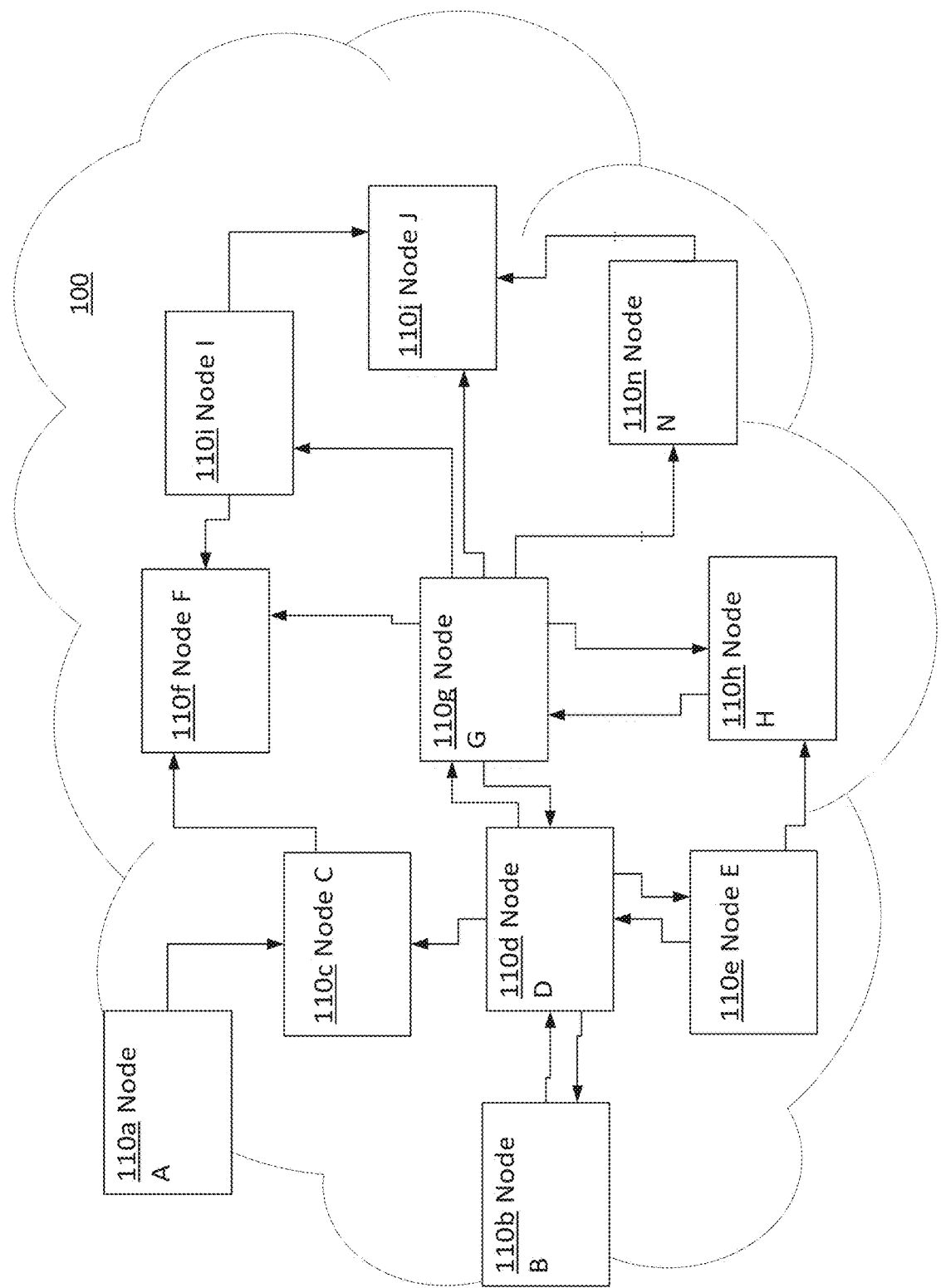
FIG. 1 is an illustrative view of various aspects of an example networking system in which the techniques described herein may be practiced.

In the following description, for the purposes of explanation, numerous specific details are set forth in order to provide a thorough understanding of the present inventive subject matter. It will be apparent, however, that the present inventive subject matter may be practiced without these specific details. In other instances, well-known structures and devices are shown in block diagram form in order to avoid unnecessarily obscuring the present inventive subject matter.

Embodiments are described herein according to the following outline:

1.0. General Overview
2.0. System Overview
  2.1. Network
  2.2. Example Network Device
    2.2.1. Ports
    2.2.2. Packet Processors
    2.2.3. Buffers
    2.2.4. Queues
    2.2.5. Traffic Management
    2.2.6. Forwarding Logic
    2.2.7. Miscellaneous
  2.3. MACsec Module Architecture
    2.3.1. Egress Dataflow
    2.3.2. Ingress Dataflow
3.0. Functional Overview
  3.1. Intelligent Error Handling
    3.1.1. Error Source Indication-CRC tunneling and wire modes
    3.1.2. CRC tunneling mode examples
    3.1.3. Wire mode examples
  3.2. Flow Control Management
    3.2.1. Encryption Path Bandwidth Expansion Examples
    3.2.2. Managing Bandwidth Expansion
      3.2.2.1. Host-side IPG Stretching
      3.2.2.2. Pause/PFC Flow Control
      3.2.2.3. End-To-End Flow Control
      3.2.2.4. Asymmetric PFC
      3.2.2.5. Flow Control State Merging
  3.3. CPU Injection/Ejection with Bandwidth Expansion Management
    3.3.1. CPU Injection
    3.3.2. CPU Ejection
    3.3.3. CPU Redirect vs Mirror 4.0. Implementation Mechanism—Hardware Overview
5.0. Extensions and Alternatives

1.0. General Overview

Approaches, techniques, and mechanisms are disclosed for improving Media Access Control Security (MACsec) performance of switches or other network devices using a unique architecture for packet error detection and handling, fault detection, and flow control.

In an embodiment, a MACsec core architecture performs intelligent error handling. The MACsec core includes two pipelines—an egress pipeline (host side) for outbound packets and an ingress pipeline (line side) for inbound packets. The system takes steps to avoid encrypting egress error packets by checking the packet and dropping the error packet before encryption, for example, if the packet contains a bad security tag or if the system does not recognize the packet (which would mean the packet was not set up through the control logic) the system does not encrypt the packet. An egress pipeline parser and classification logic can indicate that the packet is an invalid packet so the packet can be dropped later down the pipeline. In an embodiment, placing the egress pipeline parser and classification logic before a pre-encryption buffer ensures that invalid/error packets do not consume buffer space or line bandwidth. Since invalid/error packets are often due to the secure association (SA) (as per IEEE 802.1AE-2006) having been improperly set up, a CPU in the MACsec core can inject packets into the egress pipeline at a point after the pre-encrypt buffer to setup the secure channel.

In an embodiment, a packet may become corrupted on the incoming wire in either the egress or ingress direction. There is a certain probability that when a packet is transmitted over cable, the packet itself may become corrupted and cannot be repaired with a cyclic redundancy check (CRC) error. In those cases, the MACsec core can perform a store and forward operation inside the core and store the entire packet in order to examine the last word of the packet. As the packet arrives, it is broken down into words or cells and passed through the MACsec core. At the last cell of the packet, the end of packet cell (EOP), the MACsec core can determine whether the packet is a good packet or a bad packet. If it is a bad packet, the MACsec core can drop the packet immediately (in either the egress or ingress direction). Optionally, the MACsec core can convey the error to a downstream component in the egress direction. For low latency, the MACsec core may still send the packet downstream. Optionally, the MACsec core may encrypt the packet in the egress direction, but it can put a bad CRC in the packet. This is called stomping the CRC or putting a bad pattern in the CRC instead of a valid pattern which will cause the packet to be dropped or marked as invalid downstream.

In an embodiment, the MACsec core has multiple options for handling CRCs. The MACsec core may append a CRC, replace a CRC, or create packets with multiple CRCs.

In an embodiment, the MACsec core includes flow control management handling approaches for supporting different deployment scenarios. Flow control management covers situations where bandwidth management is needed because the bandwidth expansion is triggered as a byproduct of performing encryption on packets which increases the size of the packets.

In an embodiment, another reason for bandwidth management is that the MACsec core supports CPU packet injection and ejection. The MACsec core implements CPU packet injection with bandwidth expansion management where the system allows packets to be injected from the CPU into the data flow in the data path of the pipeline. For example, even though the MACsec core is receiving traffic at 400 Gbps per second on a 400 Gbps port from the line side or from the host side, the MACsec core can inject CPU packets into the data flow and manage through the bandwidth expansion that is caused by the additional packets. Because the MACsec core is sending more packets than the egress of the port can handle, the MACsec core supports flow control generation to manage through the bandwidth expansion. The MACsec core includes buffering to handle the transient congestion that is caused with the bandwidth expansion as well as novel time-based flow control generation techniques.

In an embodiment, the MACsec core implements CPU packet ejection where the system allows packets to be ejected to the CPU from the data flow. One of the reasons why CPU packet ejection is useful is that there is a control plane associated with the security and configuration components of the MACsec cores. Security keys are refreshed periodically as well as configuration of the MACsec core, programming firmware, etc. The CPU packet ejection allows the control plane to be managed entirely in software. The CPU packet ejection is useful to implement other functionalities such as communication of telemetry data through CPU source packets, control and testing, etc.

In other aspects, the invention encompasses computer apparatuses and computer-readable media configured to carry out the foregoing techniques.

2.0. System Overview

2.1. Network

FIG. 1 is an illustrative view of various aspects of an example networking system 100, also referred to as a network, in which the techniques described herein may be practiced, according to an embodiment. Networking system 100 comprises a plurality of interconnected nodes 110*a*-110*n* (collectively nodes 110), each implemented by a different computing device. For example, a node 110 may be a single networking computing device, such as a router or switch, in which some or all of the processing components described herein are implemented in one or more application-specific integrated circuits (ASICs), field programmable gate arrays (FPGAs), and/or other integrated circuit(s). As another example, a node 110 may include one or more memories storing instructions for implementing various components described herein, one or more hardware processors configured to execute the instructions stored in the one or more memories, and various data repositories in the one or more memories for storing data structures utilized and manipulated by the various components.

Each node 110 is connected to one or more other nodes 110 in network 100 by one or more communication links, depicted as lines between nodes 110. The communication links may be any suitable wired cabling or wireless links. The hardware and/or other logic by which a node sends and receives data over a communication link is referred to as a network interface, or simply an interface. Note that system 100 illustrates only one of many possible arrangements of nodes within a network. Other networks may include fewer or additional nodes 110 having any number of links between them.

While each node 110 may or may not have a variety of other functions, in an embodiment, each node 110 is configured to send, receive, and/or relay data to one or more other nodes 110 via these links. In general, data is communicated as series of discrete units or structures represented by signals transmitted over the communication links.

The structure and transmission of data between nodes 110 is governed by a number of different protocols. There may be multiple layers of protocols, typically beginning with a lowest layer, such as a "physical" layer that governs the transmission and reception of raw bit streams as signals over a transmission medium. Each layer defines a data unit (the protocol data unit, or "PDU"), which is a discrete unit of data that the layer acts upon. For instance, the PDU of the next layer, known as the data link layer, will typically be an Ethernet frame. The PDU of the following layer, known as the network layer, is typically an Internet Protocol packet, which is encapsulated inside the Ethernet frame. Yet another layer is a transport layer, in which packets defined by the network layer are combined to form a PDU known as a TCP segment or UDP datagram. The Open Systems Interconnection model of communications describes these and other layers of communications. However, other models defining other ways of layering information may also be used. The Internet protocol suite, or "TCP/IP stack," is one example of a common group of protocols that may be used together over multiple layers to communicate information. However, techniques described herein may have application to other protocols outside of the TCP/IP stack.

For convenience, many of the techniques described in this disclosure are described with respect to embodiments where the data units (PDUs) are IP packets in a L3 (level 3, or network layer) network or Ethernet frames in an L2 (level 2, or data link layer) network, in which contexts the described techniques have particular advantages. It will be recognized, however, that these techniques may also be applied to realize advantages in handling other types of data units conforming to other protocols and/or at other communication layers within a network. Thus, unless otherwise stated or apparent, the techniques described herein should also be understood to apply to contexts in which the PDUs are of any other types of data structures communicated across a network, such as segments, InfiniBand Messages, datagrams, etc. That is, in these contexts, other types of data structures may be used in place of packets, frames, and so forth.

A given node 110 may not necessarily have a link to each other node 110, particularly in more complex networks. For example, in wired networks, each node may only have a limited number of interfaces, and hence a limited number of physical ports into which cables may be plugged in to create links. Certain "terminal" nodes 110—often servers or end-user devices—may only have one or a handful of ports. Other nodes 110, such as switches, hubs, or routers, may have a great deal more ports, and typically are used to relay information between the terminal nodes. The arrangement of nodes 110 and links in a network is said to be the topology of the network and is typically visualized as a network graph or tree.

A given node 110 in the network 100 may communicate with another node 110 in the network 100 by sending data units along one or more different paths through the network 100 that lead to the other node 110, each path including any number of intermediate nodes 110. The transmission of data across a computing network 100 typically involves sending units of data, such as packets, cells, or frames, along paths through intermediary networking devices, such as switches or routers, that direct or redirect each data unit towards a corresponding destination.

In an embodiment, a node 110 does not actually need to specify a full path for a data unit that it sends. Rather, the node 110 may simply be configured to calculate the best path for the data unit out of the device (e.g., which egress port it should send the data unit out on). When a node 110 receives a data unit that is not addressed directly to the node 110, based on header information associated with a data unit, such as path and/or destination information, the node 110 relays the data unit along to either the destination node 110, or a next hop node 110 that the node 110 calculates is in a better position to relay the data unit to the destination node 110. In this manner, the actual path of a data unit is the product of each node 110 along the path making routing decisions about how best to move the data unit along to the destination node 110 identified by the data unit.

While a data unit is passing through an intermediary node 110—a period of time that is conceptualized as a "visit" or "hop"—the node 110 may perform any of a variety of actions, or processing steps, with the data unit. The exact set of actions taken will depend on a variety of characteristics of the data unit, such as metadata found in the header of the data unit, and in many cases the context or state of the node 110. For example, address information specified by or otherwise associated with the data unit, such as a source address, a destination address, or path information, is typically used to determine how to handle a data unit (e.g., what actions to take with respect to the data unit). For instance, an Internet Protocol ("IP") data packet may include a destination IP address field within the header of the IP data packet, based upon which a network device may determine one or more other networking devices, among a number of possible other networking devices, to forward the IP data packet to. The logic within a node 110 that controls the specific set of actions performed with respect to a given data unit is often referred to as "packet-switching" or "packet-handling" logic.

2.2 Example Network Device

Figure 2:
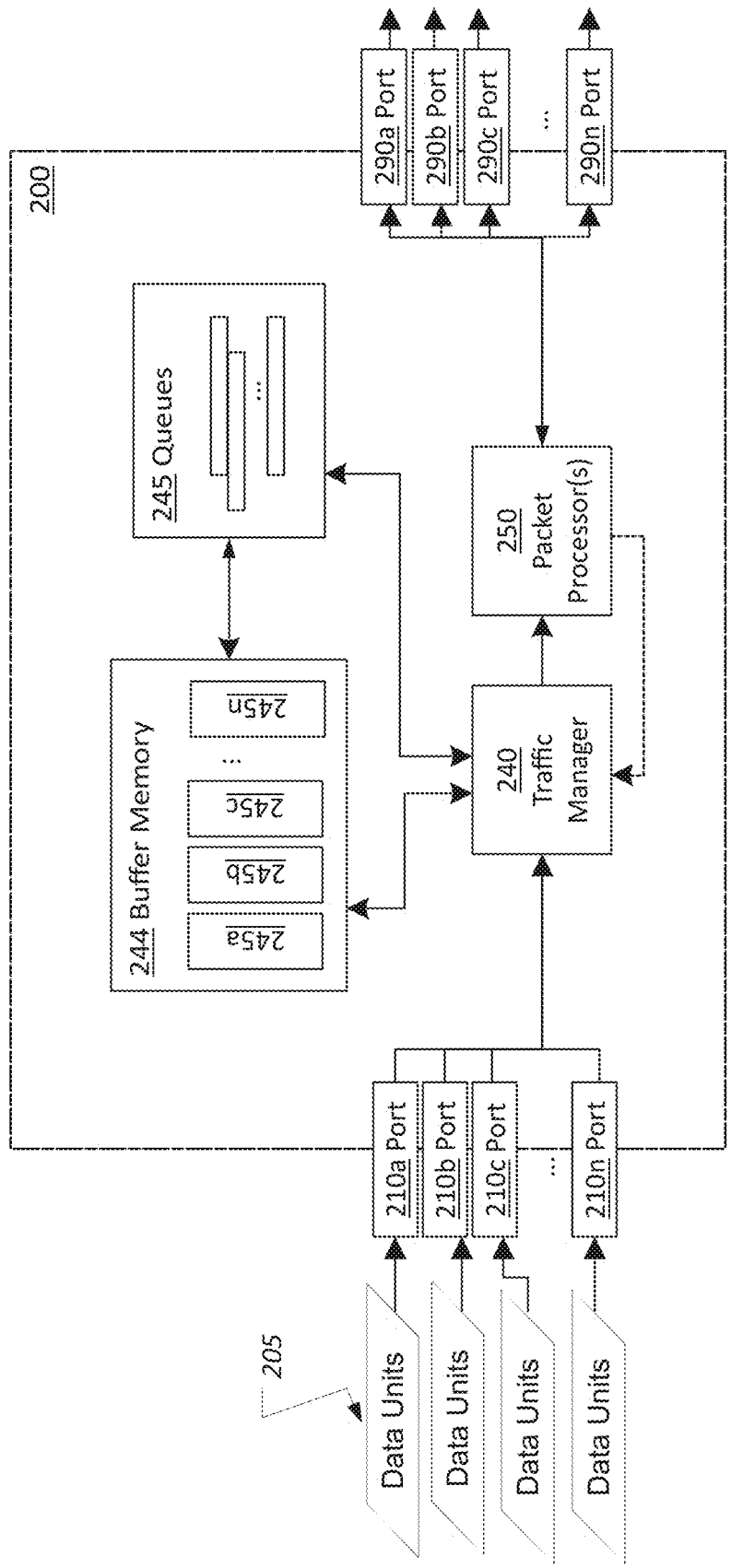
FIG. 2 illustrates an example network device, according to an embodiment.

FIG. 2 is an illustrative view of various aspects of packet-switching logic within an example network device 200 in which techniques described herein may be practiced, according to an embodiment. Network device 200 is a computing device comprising any combination of hardware and software configured to implement the various logical components described herein, including components 210-290. For example, the apparatus may be a single networking computing device, such as a router or switch, in which some or all of the components 210-290 described herein are implemented using application-specific integrated circuits (ASICs) or field programmable gate arrays (FPGAs). As another example, an implementing apparatus may include one or more memories storing instructions for implementing various components described herein, one or more hardware processors configured to execute the instructions stored in the one or more memories, and various data repositories in the one or more memories for storing data structures utilized and manipulated by various components 210-290.

Device 200 is generally configured to receive and forward data units 205 to other devices in a network, such as network 100, by means of a series of operations performed at various components within the device 200. Note that certain nodes 110 in a system such as network 100 may each be or include a separate network device 200. In an embodiment, a node 110 may include more than one device 200. In an embodiment, device 200 may itself be one of a number of components within a node 110. For instance, network device 200 may be an integrated circuit, or "chip," dedicated to performing switching and/or routing functions within a network switch or router. The network switch or router may further comprise one or more central processor units, storage units, memories, physical interfaces, LED displays, or other components external to the chip, some or all of which may communicate with the chip.

A non-limiting example flow of a data unit 205 through various subcomponents of the packet-switching logic of device 200 is as follows. After being received via a port 210, a data unit 205 may be buffered by an arbiter (not depicted) until the data unit 205 can be processed by an packet processor 250, and then delivered to an interconnect (not depicted). From the interconnect, the data unit 205 may be forwarded to a traffic manager 240. The traffic manager 240) may store the data unit 205 in a buffer 244 and assign the data unit 205 to a queue 245. The traffic manager 240 manages the flow of the data unit 205 through the queue 245 until the data unit 205 is released to an egress packet processor 250. Depending on the processing, the traffic manager 240 may then assign the data unit 205 to another queue so that it may be processed by yet another egress processor 250, or the egress packet processor 250 may send the data unit 205 to an egress arbiter (not depicted) from which the data unit 205 is finally forwarded out another port 290. Of course, depending on the embodiment, the switching logic may omit some of these subcomponents and/or include other subcomponents in varying arrangements.

Example components of a device 200 are now described in further detail.

2.2.1 Ports

Network device 200 includes ports 210/290, by which the packet-handling logic is coupled to various network interfaces that receive and transmit data units 205. Ports 290, including ports 290*a-n*, are inbound ("ingress") ports by which data units 205 are received over a network. Ports 290, including ports 290*a-n*, are outbound ("egress") ports by which at least some of the data units 205 are sent out to other destinations within the network, after having been processed by the network device 200.

Ports 210/290 are depicted as separate ports for illustrative purposes, but may actually correspond to the same physical network interfaces on the network device 210. That is, a network device 200 may both receive data units 205 and send data units 205 over a single physical port, and the single physical port may thus function as both an ingress port 210 and egress port 290. Nonetheless, for various functional purposes, certain logic of the network device 200 may view a single physical port as a separate ingress port 210 and egress port 290. Moreover, for various functional purposes, certain logic of the network device 200 may subdivide a single physical ingress port or egress port into multiple ingress ports 210 or egress ports 290, or aggregate multiple physical ingress ports or egress ports into a single ingress port 210 or egress port 290. Hence, in various embodiments, ports 210 and 290 should be understood as distinct logical constructs that are mapped to physical interfaces rather than simply as distinct physical constructs.

2.2.2 Packet Processors

A device 200 comprises one or more packet processing components 250, or "packet processors." Different packet processors 250 may be configured to perform different packet processing tasks. These tasks may include, for example, identifying paths along which to forward data units 205, forwarding data units 205 to egress ports 290, implementing flow control and/or other policies, manipulating packets, performing statistical or debugging operations, and so forth. A device 200 may comprise any number of packet processors 250 configured to perform any number of processing tasks.

In an embodiment, the packet processors 250 within a device 200 may be arranged such that the output of one packet processor 250 may, eventually, be inputted into another packet processor 250, in such a manner as to pass data units 205 from certain packet processor(s) 250 to other packet processor(s) 250 in a sequence of stages, until finally disposing of the data units 205 (e.g. by sending the data units 205 out an egress port 290, "dropping" the data units 205, etc.). The exact set and/or sequence of packet processors 250 that process a given data unit 205 may vary, in some embodiments, depending on attributes of the data unit 205 and/or the state of the device 200. Any number of packet processors 250 may be chained together in this manner.

Based on decisions made while processing a data unit 205, a packet processor 250 may, in some embodiments, and/or for certain processing tasks, manipulate a data unit 205 directly. For instance, the packet processor 250 may add, delete, or modify information in a data unit header or payload. In other embodiments, and/or for other processing tasks, a packet processor 250 may generate control information that accompanies the data unit 205, or is merged with the data unit 205, as the data unit 205 continues through the device 200. This control information may then be utilized by other components of the device 200 to implement decisions made by the packet processor 250.

In an embodiment, a packet processor 250 need not necessarily process an entire data unit 205 but may rather only receive and process a subunit of a data unit 205, such as a cell comprising header information for the data unit. For instance, if the data unit 205 is a packet comprising multiple cells, the first cell, or a first subset of cells, might be forwarded to a packet processor 250, while the remaining cells of the packet (and potentially the first cell(s) as well) are forwarded in parallel to a merger component where they await results of the processing.

In an embodiment, a packet processor may be generally classified as an ingress packet processor 250 or an egress packet processor 250. Generally, an ingress processor 250 resolves destinations for a traffic manager 240 to determine which ports 290 and/or queues 245 a data unit 205 should depart from. There may be any number of ingress processors 250, including just a single ingress processor 250.

In an embodiment, an ingress processor 250 performs certain intake tasks on data units 205 as they arrive. These intake tasks may include, for instance, and without limitation, parsing data units 205, performing routing related lookup operations, categorically blocking data units 205 with certain attributes and/or when the device 200 is in a certain state, duplicating certain types of data units 205, making initial categorizations of data units 205, and so forth. Once the appropriate intake task(s) have been performed, the data units 205 are forwarded to an appropriate traffic manager 240, to which the ingress processor 250 may be coupled directly or via various other components, such as an interconnect component.

The egress packet processor(s) 250 of a device 200, by contrast, may be configured to perform non-intake tasks necessary to implement the switching logic of the device 200. These tasks may include, for example, tasks such as identifying paths along which to forward the data units 205, implementing flow control and/or other policies, manipulating data units, performing statistical or debugging operations, and so forth. In an embodiment, there may be different egress packet processors(s) 250 assigned to different flows or other categories of traffic, such that not all data units 205 will be processed by the same egress packet processor 250.

In an embodiment, each egress processor 250 is coupled to a different group of egress ports 290 to which they may send data units 205 processed by the egress processor 250. In an embodiment, access to a group of ports 290 may be regulated via an egress arbiter coupled to the egress packet processor 250. In some embodiments, an egress processor 250 may also or instead be coupled to other potential destinations, such as an internal central processing unit, a storage subsystem, or a traffic manager 240.

2.2.3 Buffers

Since not all data units 205 received by the device 200 can be processed by the packet processor(s) 250 at the same time, various components of device 200 may temporarily store data units 205 in one or more buffers 244 while the data units 205 are waiting to be processed. For example, a certain packet processor 250 may only be capable of processing a certain number of data units 205, or portions of data units 205, in a given clock cycle, meaning that other data units 205, or portions of data units 205, destined for the packet processor 250 must either be ignored (e.g., dropped) or stored. At any given time, a large number of data units 205 may be stored in the buffers 244 of the device 200, depending on network traffic conditions.

A device 200 may include a variety of buffers 244, each utilized for varying purposes and/or components. A buffer 244 may be implemented using a single physical memory unit (e.g. SRAM, DRAM, etc.), a designated portion of a memory unit, or a collection of memory units, depending on an embodiment.

Generally, a data unit 205 awaiting processing by a component is held in a buffer 244 associated with that component until the data unit 205 is "released" to the component for processing. For example, a traffic manager 240 will typically have a relatively large buffer 244, referred to as an egress buffer, in which it buffers data units 205 prior to releasing those data units 250 to an egress packet processor 250.

Various metrics related to the buffers 244 may be tracked, such as the number of buffer entries utilized, percentage of buffer space utilized, and so forth. These metrics may be global, or specific to a context. For instance, the amount of buffered data assigned to a specific queue or port may be tracked. Utilization metrics for these contexts may be calculated as percentages of amounts of buffer space allocated to these contexts.

2.2.4 Queues

In an embodiment, to manage the order in which data units 205 are processed from buffers 244, various components of a device 200 may implement queueing logic. For example, the flow of data units 205 through the egress buffers 244 of traffic manager 240 may be managed using egress queues while the flow of data units 205 through the buffers of an ingress arbiter might be managed using ingress queues.

A queue 245 is a set of data nodes arranged in some order by metadata describing the queue 245. The queue 245 includes a head node, or head, which is typically the next node to be processed, and a tail node, or tail, which is typically the node most recently added to the queue. A node will typically progress from the tail to the head over time as other nodes are processed and removed from the queue.

In the case of queue 245, the nodes are data unit 205, or the buffer locations(s) at which the data unit 205 begins. A data unit 205 that has been added to a queue 245 is said to be "linked" to that queue 245. A data unit 205 may belong to one or more queues 245.

In many embodiments, the sequence in which the queue 245 arranges its constituent data units 205 generally corresponds to the order in which the data units 205 or data unit portions in the queue 245 will be released and processed. In some embodiments, the number of data units 205 or data unit portions assigned to a given queue 245 at a given time may be limited, either globally or on a per-queue basis, and this limit may change over time.

2.2.5 Traffic Management

According to an embodiment, a device 200 further includes one or more traffic managers 240) configured to control the flow of data units 205 to one or more packet processor(s) 250. A traffic manager 240 may receive data units 205 directly from a port 210, from an ingress processor 250, and/or other suitable components of device 200. In an embodiment, the traffic manager 240 is configured to receive up to one cell from each possible source (e.g. each port 210) each clock cycle of the traffic manager 240.

Traffic manager 240 may include or be coupled to buffers 244 for buffering data units 205 prior to sending those data units 205 to their respective processor(s) 250. A buffer manager within the traffic manager 240 may temporarily store data units 205 in buffers 244 as they await processing by processor(s) 250. A data unit 205 or data unit portion in a buffer 244 may eventually be "released" to one or more processor(s) 250 for processing, by reading the data unit 205 from the buffer 244 and sending the data unit 205 to the processor(s) 250. In an embodiment, traffic manager 240 may release up to a certain number of data units 205 from buffers 244 to processors 250 each clock cycle.

Beyond managing the use of buffers 244 to store data units 205 (or copies thereof), a traffic manager 240 may include queue management logic configured to assign data units 205 to queues 245 and manage the flow of data units 205 through queues 245. The traffic manager 240 may, for instance, "enqueue" a data unit 205 that has been fully buffered by identifying a specific queue 245 to assign the data unit 205 to, and then linking a data unit identifier or other metadata to the assigned queue. The traffic manager 240 may further determine when to release—also referred to as dequeuing—data units 205 from queues 245 by sending instructions to the buffer manager 244 to read/release the data units 205 and then providing the data read from the buffer 244 to specific packet processor(s) 250.

Though only one packet processor 250 and traffic manager 240 are depicted, a device 200 may comprise any number of packet processors 250 and traffic managers 240. For instance, different sets of ports 210 and/or ports 290 may have their own traffic manager 240 and packet processors 250. As another example, in an embodiment, the traffic manager 240 may be duplicated for some or all of the stages of processing a data unit. For example, system 200 may include a traffic manager 240 and egress packet processor 250 for an egress stage performed upon the data unit 205 exiting the system 200, and/or a traffic manager 240 and packet processor 250 for any number of intermediate stages. The data unit 205 may thus pass through any number of traffic managers 240 and/or packet processors 250 prior to exiting the system 200. In other embodiments, only a single traffic manager 240 is needed. If intermediate processing is needed, flow of a data unit 205 may loop back to the traffic manager 240 for buffering and/or queuing after each stage of intermediate processing.

In an embodiment, a traffic manager 240 is coupled to the output of an ingress packet processor(s) 250, such that data units 205 (or portions thereof) are assigned to buffers 244 only upon being initially processed by an ingress packet processor 250. Once in an egress buffer 244, a data unit 205 (or portion thereof) may be "released" to one or more egress packet processor(s) 250 for processing.

In the course of processing a data unit 205, a device 200 may replicate a data unit 205 one or more times for purposes such as, without limitation, multicasting, mirroring, debugging, and so forth. For example, a single data unit 205 may be replicated to multiple egress queues 245. For instance, a data unit 205 may be linked to separate queues 245 for each of ports 1, 3, and 9. As another example, a data unit 205 may be replicated a number of times after it reaches the head of a queue 245 (e.g. for different egress processors 250). Hence, though certain techniques described herein may refer to the original data unit 205 that was received by the device 200, it will be understood that those techniques will equally apply to copies of the data unit 205 that have been generated for various purposes.

2.2.6 Forwarding Logic

The logic by which a device 200 determines how to handle a data unit 205—such as where and whether to send a data unit 205, whether to perform additional processing on a data unit 205, etc.—is referred to as the forwarding logic of the device 200. This forwarding logic is collectively implemented by a variety of the components of the device 200, such as described above. For example, an ingress packet processor 250 may be responsible for resolving the destination of a data unit 205 and determining the set of actions/edits to perform on the data unit 205, and an egress packet processor 250 may perform the edits. Or, the egress packet processor 250 may also determine actions and resolve a destination in some cases. Also, there may be embodiments where the ingress packet processor 250 performs edits as well.

In an embodiment, a device 200 will typically store in its memories one or more forwarding tables (or equivalent structures) that map certain data unit attributes or characteristics to actions to be taken with respect to data units 205 having those attributes or characteristics, such as sending a data unit 205 to a selected path, or processing the data unit 205 using a specified internal component. For instance, such attributes or characteristics may include a Quality-of-Service level specified by the data unit 205 or associated with another characteristic of the data unit 205, a flow control group, an ingress port 210 through which the data unit 205 was received, a tag or label in a packet's header, a source address, a destination address, a packet type, or any other suitable distinguishing property. A device 200 may, for example, implement logic that reads such a table, determines one or more ports 290 to send a data unit 205 to based on the table, and sends the data unit 205 to an egress processor 250 that is coupled to the one or more ports 290.

According to an embodiment, the forwarding tables describe groups of one or more addresses, such as subnets of IPV4 or IPv6 addresses. Each address is an address of a network device on a network, though a network device may have more than one address. Each group is associated with a potentially different set of one or more actions to execute with respect to data units that resolve to (e.g. are directed to) an address within the group. Any suitable set of one or more actions may be associated with a group of addresses, including without limitation, forwarding a message to a specified "next hop," duplicating the message, changing the destination of the message, dropping the message, performing debugging or statistical operations, applying a quality of service policy or flow control policy, and so forth.

For illustrative purposes, these tables are described as "forwarding tables," though it will be recognized that the extent of the action(s) described by the tables may be much greater than simply where to forward the message. For example, in an embodiment, a table may be a basic forwarding table that simply specifies a next hop for each group. In other embodiments, a table may describe one or more complex policies for each group. Moreover, there may be different types of tables for different purposes. For instance, one table may be a basic forwarding table that is compared to the destination address of each packet, while another table may specify policies to apply to packets upon ingress based on their destination (or source) group, and so forth.

As data units 205 are routed through different nodes in a network, the nodes may, on occasion, discard, fail to send, or fail to receive certain data units 205, thus resulting in the data units 205 failing to reach their intended destination. The act of discarding of a data unit 205, or failing to deliver a data unit 205, is typically referred to as "dropping" the data unit. Instances of dropping a data unit 205, referred to herein as "drops" or "packet loss," may occur for a variety of reasons, such as resource limitations, errors, or deliberate policies. Different components of a device 200 may make the decision to drop a data unit 205 for various reasons. For instance, a traffic manager 240) may determine to drop a data unit 205 because, among other reasons, buffers 244 are overutilized, a queue 245 is over a certain size, a port 290 (or its associated interface) is too busy, and/or a data unit 205 has a certain characteristic.

2.2.7 Miscellaneous

Device 200 illustrates only several of many possible arrangements of components in a network device configured to provide the functionality described herein. Other arrangements may include fewer, additional, or different components, and the division of work between the components may vary depending on the arrangement. Moreover, in an embodiment, the techniques described herein may be utilized in a variety of computing contexts other than within a network 100.

For simplification, the traffic managers, packet processors, and other components are on occasion described herein as acting upon or with respect to a data unit, when in fact only a portion of the data unit may be sent to or otherwise available to the component. For instance, a packet processor may be said to process a data unit, when in fact only the data unit control portion is available to the packet processor. In such contexts, it will be understood that the information about the data unit that is actually available to the component is a representation of the data unit to that component. Any actions described herein as having been taken by the component on or with respect to the data unit may occur with respect to the representation of the data unit, and not necessarily the complete data unit.

It will be appreciated that the actual physical representation of a data unit may change as a result of the processes described herein. For instance, a data unit may be converted from a physical representation at a particular location in one memory to a signal-based representation, and back to a physical representation at a different location in a potentially different memory, as it is moved from one component to another within a network device or even between network devices. Such movement may technically involve deleting, converting, and/or copying some or all of the data unit any number of times. For simplification, however, the data unit is logically said to remain the same data unit as it moves through the device, even if the physical representation of the data unit changes. Similarly, the contents and/or structure of a data unit may change as it is processed, such as by adding or deleting header information, adjusting cell boundaries, or even modifying payload data. A modified data unit is nonetheless still said to be the same data unit, even after altering its contents and/or structure.

2.3 MACsec Module Architecture

Figure 3:
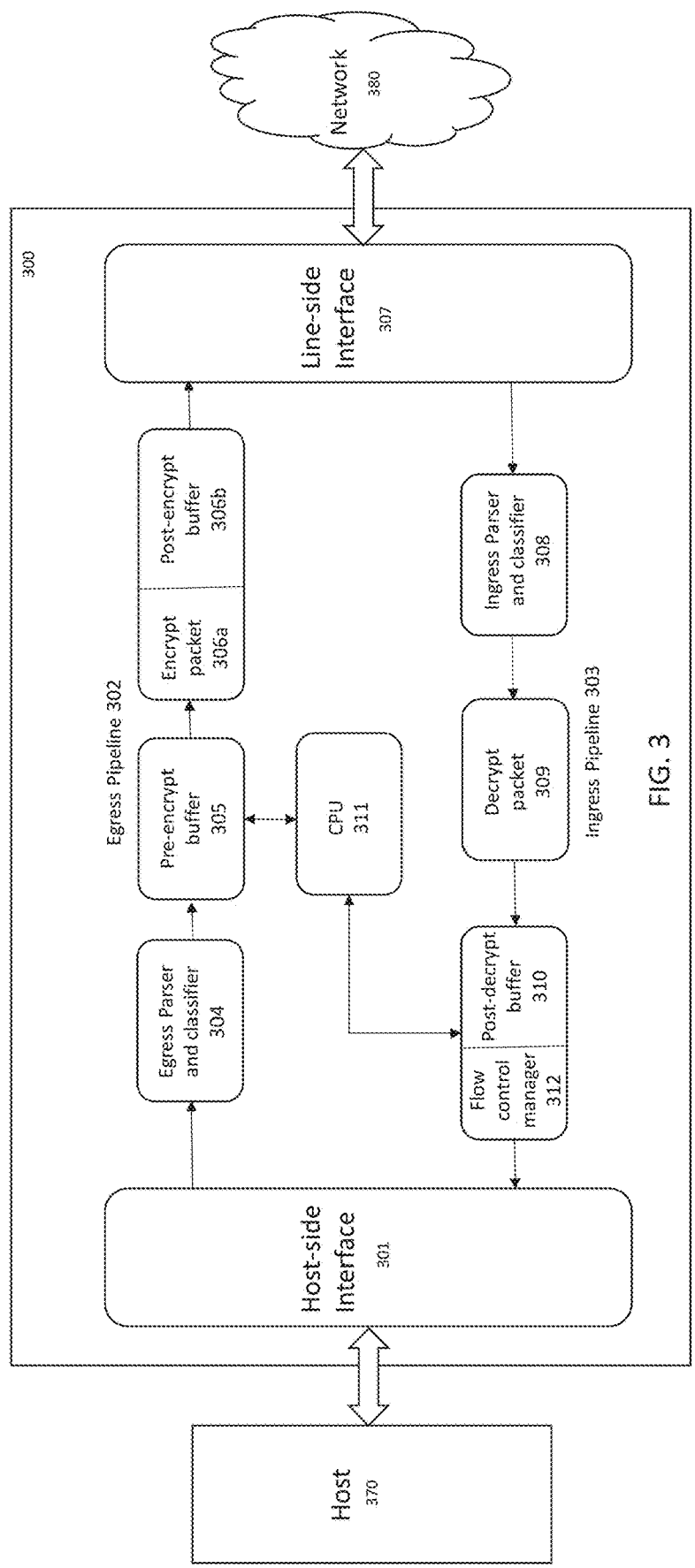
FIG. 3 illustrates a MACsec core architecture, according to an embodiment.

FIG. 3 illustrates a MACsec core architecture according to an embodiment. The MACsec core 300 can be connected to multiple ports on a switching device (e.g., network device 200, etc.) or may be connected to each port separately via the host side interface 301. The following description discusses the MACsec core 300 as an individual device, however, the MACsec core 300 is considered a building block. In an embodiment, the MACsec core 300 may be a standalone network appliance or integrated within a device, e.g., a switch, separate SERDES Framer Interface (SFI), host, etc., where there can be multiple instantiations of the MACsec core 300. When the MACsec core 300 is connected to a switch or host, all of the traffic for a channel flows through the MACsec core 300.

In an embodiment, the MACsec core 300 performs unique features that improve the performance and reliability of the handling of packets in the MACsec environment. Inside the MACsec core 300 data flow, there is an egress pipeline 302 and an ingress pipeline 303. The egress pipeline 302 is shown in the upper part of the MACsec core 300 diagram and the ingress pipeline 303 is shown in the lower part of the MACsec core 300 diagram.

2.3.1. Egress Dataflow

Referring to FIG. 3, the host 370 may be a computing device, e.g., a switch device, a server, etc., and is connected to the host side interface 301 and the line side interface 307 is the end point going out to the network 380. Egress parser and classifier 304 performs error handling of the packets and initial staging of the data. Egress parser and classifier 304 receives packets from the host side interface 301. The egress parser and classifier 304 examines a packet and determines the security attributes of the packet. The egress parser and classifier 304 temporarily buffers one or two data words, for example, from segments of the packet and formats the packet to provide the appropriate signaling.

Optionally, there may be clock domain crossing which allows the MACsec core 300 to run on one clock domain with the host side interface 301 and line side interface 307 running on separate clock domains that are at a higher or lower frequency than the MACsec core 300. This may depend on the operator's goals. For example, a goal may be low power and there are certain frequency requirements that are required by the device connected to the host side interface 301 and/or the device connected to the line side interface 307 that may not be required by the MACsec core data path depending on how the data path is sized. There could be a domain crossing that allows the system to achieve lower power, lower costs, etc.

The MACsec core 300 performs intelligent error handling. The egress parser and classifier 304 takes steps to avoid encrypting error/invalid packets down the egress pipeline 302 by checking the packet for an error condition and causing the error/invalid packet to be dropped before encryption, for example, determining whether the egress parser and classifier 304 does not recognize the packet (which means the packet was not set up properly through the control logic). The packet is dropped before consuming buffer space, this ensures that buffer space and line bandwidth is not consumed by invalid packets. The egress parser and classifier 304 indicates that a packet is invalid and the pre-encrypt buffer 305 can drop the packet.

Another scenario may occur where a packet gets corrupted on the wire. There is a certain probability that when a packet is transmitted over cable, the packet itself may become corrupted and the packet is not repairable with a CRC error. In such a case, the MACsec core 300 may perform a full store and forward and store the entire packet in order to check the last word of the packet. As the packet arrives into the MACsec core 300, it is being broken up into words or cells and transmitted through the MACsec core 300. The system waits until the last cell of the packet, the end of packet (EOP) cell, to determine whether it is a good packet or bad packet. If the packet is a bad packet, then it can be dropped immediately. This removes an attack vector where malformed packets are sent in an attempt to guess keys. The encrypt pipeline 302 implementation of store and forward reduces the chances of a replay attack being successful. In an embodiment, the fact that the packet is bad may be conveyed to the line-side downstream component. For low latency, the packet can be sent downstream in a cut-through mode. The system can encrypt the packet, but a bad CRC can be inserted into the packet. This is called stomping the CRC or placing a bad pattern in the CRC instead of placing a valid pattern in the CRC which causes the packet to be dropped or marked as invalid downstream. Depending on the stomp code, the MACsec on the other side (e.g., M2 in FIG. 4) may be configured to still advance the replay window, since the packet that arrived at M1 was already corrupted before encryption occurred. This reduces opportunities for replay attacks when there are errors on the wire between S1 and M1, even for cut-through operations. Alternatively, the MACsec can be configured to preserve the bad CRC that arrived at M1 from S1, encrypt the packet and add a good outer CRC. Assuming there are no errors between M1 and M2, M2 detects a good outer CRC, advances the replay window as is normally performed for good packets, decrypts the frame, checks the ICV, then forwards the packet to S2. S2 detects that the frame is corrupt and drops the packet. In this case, M1 and M2 act as a wire, even though they are performing encryption and decryption operations on the packet.

The pre-encrypt buffer 305 performs the packet transformation for the encryption stage. The encrypt packet 306a adds an encryption header to the packet which causes bandwidth expansion in the data path. The encryption header is added to every packet that is to be encrypted. In an embodiment, the encryption, for example, can add 24 bytes or 32 bytes of overhead to the packet. In the case where a packet is authenticated only, a 24-byte or 32-byte security tag (including the ICV), can be added to the packet by the encryption. For example, in a 64-byte packet adding 32 bytes of encryption header onto the 64 bytes and ignoring the inter packet gap (IPG) preamble, essentially adds an additional 50% (approximately) of data to that packet. The bandwidth is being expanded substantially in those cases. Given that the host side interface and the line side interface ports are going to be operating at the same rate, there is nowhere for that extra data to go, except for the pre-encrypt buffer 305. The pre-encrypt buffer 305 is the point in the MACsec core 300 where there is the most buffering than any other point in the device. The congestion in the pre-encrypt buffer 305 is monitored to determine when an indication to slow down should be sent to the host side. The slow down can be indicated through either a pause or priority flow control (PFC) frame. In the ingress pipeline 303, there is a flow control manager 312 that can interact with the pause or PFC frame.

The pre-encrypt buffer 305 performs rate adaptation to manage the bandwidth expansion. In an embodiment, there are several reasons for bandwidth expansion. One reason is CPU packet injection, where the CPU 311 is injecting new packets into the data path separate from what is coming in from the host. The pre-encrypt buffer 305 absorbs data from the host to allow the CPU 311 to insert the CPU packet into the encryption path to be encrypted by encrypt packet 306a. Another reason is the increase in packet size due to the encryption header, as discussed above. Yet another reason is a double CRC mode, that is discussed in detail below, where the system adds a CRC, it is adding four bytes to the packet size, which makes a 64-byte packet expand to 68 bytes. This expands the pipeline bandwidth and the eventual backpressure has to be managed.

The CPU 311 can inject packets into the data path of each of the channels. Packets can be sent for each control channel to perform operations such as security key refresh. This is managed on a per channel basis. The system supports queues for each channel which allows the data to be sent into the network 380 appropriately.

The congestion in the pre-encrypt buffer 305 is monitored to determine when an indication to slow down should be sent to the host side. The rate adaptation to accommodate the slow down can be indicated through either a pause or PFC frame. In the ingress pipeline 303, the post-decrypt buffer 310b interacts with the pause or PFC frame.

The pause frame tells the receiver to stop all traffic on a given port. It tells the partner for the port that it is congested and not to send anything on that port. The PFC frame tells the partner for the port that it is congested and not to send anything on the port for one, two, or n priorities. The MACsec core 300 provides buffering to manage data that is in flight because, from the time that a pause or PFC frame is created and sent to the link partner to when the link partner can act, the MACsec core 300 is still receiving data. The link partner cannot act immediately. The sender first has to deliver the message via cables, where cable length varies depending on the distance between the device and a given link partner. During that time, data can arrive at the MACsec core 300. The pre-encrypt buffer 305 manages the data that is in flight while waiting on the link partner to stop. The link partner cannot stop immediately, so it takes some time for the packet flow to stop. In the same manner, when the system tells the link partner to restart the packet flow, the link partner cannot start immediately, so the system has to account for that time, as discussed below. The MACsec core 300 buffers packets to maintain full throughput and to avoid under-utilization of the port.

The pre-encrypt buffer 305 formats and schedules data for processing by the encrypt packet 306a. In an embodiment, the encrypt packet 306a is not meant to be the primary buffer point in the MACsec core 300 because it is post expansion. In order to maintain a shallow buffer in the encrypt packet 306a, the pre-encrypt buffer 305 implements managed credits. Managed credits is a credit-based algorithm that tightly controls how much data can be in flight toward the post-encrypt buffer 306b. The pre-encrypt buffer 305 keeps accounting for the expansion for all of the channels. Whenever a packet is transmitted that should be encrypted the pre-encrypt buffer 305 accounts for that storage in the post-encrypt buffer 306b to make sure that it is not overflowing the post-encrypt buffer 306b. This allows the pre-encrypt buffer 305 to be the primary buffer at that point and the post-encrypt buffer 306b can manage transient events where some expansion is a bit larger than the line side interface 307 can handle instantaneously.

The pre-encrypt buffer 305 schedules packets into the encrypt packet 306a. The encrypt packet 306a performs all of the encryption on the packet and adds the header to the packet. The packet is sent from the encrypt packet 306a into the post-encrypt buffer 306b which has a shallow buffer to send data through the line side interface 307 into the network 380.

The post-encrypt buffer 306b transiently handles any congestion due to the encryption header being added. This transient bandwidth expansion is typically just over nanoseconds of expansion. The encrypt packet 306a may indicate that a packet has an error. The post-encrypt buffer 306b drops the packet and returns the credits immediately to the pre-encrypt buffer 305. For example, each dequeue from the encrypt packet 306a would result in return of one or more credits to the pre-encrypt buffer 305.

The post-encrypt buffer 306b can also avoid underruns by holding back a certain amount of data on the line side interface 307. The pre-encrypt buffer 305 provides access to one or more ports sharing the host side interface 301. Having multiple ports sharing the host side interface 301 can create jitter in the pipeline and the system can account for that jitter. Jitter can occur when post-encrypt buffer 306b starts to transmit part of a packet and the remaining part of the packet is held up because it missed its time slot in the post-encrypt buffer 306b. This causes a gap in the wire and whenever a gap occurs, it becomes an error packet. Post-encrypt buffer 306b can hold back an amount of data in its buffer to make sure that enough data is present before the line side interface 307 starts transmitting out to the network 280.

Packets are sent by the post-encrypt buffer 306b into the line side interface 307. The line side interface 307 may, for example, be connected to an 8×100Gb SERDES, 4×100Gb SERDES, or whatever the bundling of SERDES happens to be. Note that the host side interface 301 may be connected to a different type of SERDES than line side interface 307. For example, the host side interface 301 may be connected to a 8×100Gb SERDES while the line side interface 307 may be connected to a 16×50Gb SERDES or a 8×100Gb SERDES.

2.3.2. Ingress Dataflow

The ingress parser and classifier 308 performs the error handling in the ingress pipeline 303. The operation of the ingress parser and classifier 308 is similar to the egress parser and classifier 304. The ingress parser and classifier 308 checks that the packets coming in from the line side interface 307 are valid. If the data is bad coming in from the line side interface 307 and the ingress parser and classifier 308 detects this at the startup frame (e.g., SA key has expired, etc.), then the ingress parser and classifier 308 immediately starts to drop the packet's frames. The ingress parser and classifier 308 can also perform some initial staging if bandwidth is not immediately available to send the packet down the ingress pipeline 303 data path for a given port. The ingress parser and classifier 308 can buffer the data temporarily and then format it before parsing and classifying packets. As discussed above, the MACsec core 300 can perform clock domain crossing which allows the MACsec core 300 to run on one clock domain with the host side interface 301 and line side interface 307 interfaces running on separate clock domains.

The ingress parser and classifier 308 schedules packet identification by looking at the packet header in order to provide instructions to the decrypt packet 309. Once the ingress parser and classifier 308 has classified the packet, it can signal whether the packet has a security tag failure to the decrypt packet 309. If the ingress parser and classifier 308 communicates a packet security tag failure, then the decrypt packet 309 does not decrypt packet. If the ingress parser and classifier 308 informs the decrypt packet 309 that the packet is good, the decrypt packet 309 decrypts the packet and removes the security tag header (e.g., 24 bytes, 32 bytes, etc.). The decrypt packet 309 sends the packet frames to the post-decrypt buffer 310.

A scheduler in the post-decrypt buffer 310 manages data traffic that is contending for access in the data path. If one of the components in the pipeline misses its time slot on a scheduler, then that component has to wait until the next round to insert packet frames. This introduces jitter into the pipeline. The scheduler in the post-decrypt buffer 310 can hold back a certain amount of data to account for that jitter to avoid an underrun condition for the channel and then start to send the data to the host side interface 301.

The post-decrypt buffer 310 can have the ability to do a full store and forward of the data, which allows it to wait until the end of packet (EOP) arrives. The post-decrypt buffer 310 can then check to see if the packet is good (e.g., has passed the authentication check, ICV at EOP is verified, etc.). If the packet is good, then the post-decrypt buffer 310 can send the packet to the host via the host side interface 301. If the packet is not good, the post-decrypt buffer 310 can drop the packet and the packet is not sent to the host (as opposed to a cut-through operation, for example, which will send the packet in clear text to the host in this case, even if it did not pass authentication).

In an embodiment, a flow control manager 312 manages flow control messages to the host via the host side interface 301. As discussed above, congestion is monitored at the pre-encrypt buffer 305 and, if bandwidth expansion exceeds a threshold value, for example, if traffic is being sent at the full rate of the port and encryption or authentication is active, constantly adding 24 or 32 bytes to every packet, some buffer build-up in the buffer 306b occurs. When the buffer build-up exceeds a certain threshold value, the pre-encrypt buffer 305 sends a signal to the post-decrypt buffer 310. The flow control manager 312 propagates that signal to the host side interface 301, by generating a pause or PFC message, for example.

The flow control manager 312 provides end-to-end flow control, which means that the host and a downstream device in the network (e.g., the next hop of the switch, etc.) are communicating as to when to flow control the data. In an embodiment, the flow control manager 312 merges the pause or PFC frame state with the pre-encrypt buffer 305 state. If either one indicates that there is a congestion state, the flow control manager 312 sends a pause or PFC message to the host via the host side interface 301 to stop sending traffic. The flow control manager 312 triggers off of a state change and releases the flow control once both the pause or PFC frame state and the pre-encrypt buffer 305 state are in a good state such that both are in an uncongested state and indicating Xon. Thus, the flow control manager 312 manages the merged flow control state and communicates it appropriately out to the host side interface 301.

The ingress parser and classifier 308 and decrypt packet 309 perform the same essential operations as the egress parser and classifier 304 and encrypt packet 306a. The ingress parser and classifier 308 performs the processing to determine what action should be taken on the encrypted traffic and the decrypt packet 309 performs the decryption. Once the packet is decrypted by the decrypt packet 309, 24 bytes or 32 bytes have typically been removed from the packet.

When the flow control manager 312 sends the flow control message to the host via the host side interface 301, it generates a new packet, a new flow control packet, into the data flow that expands the bandwidth on the ingress decryption path. However, since the decrypt packet 309 is removing 24 bytes or 32 bytes, for example, from every packet due to decryption, the data flow does not see any congestion due to that condition. In a scenario where the data flow includes a burst of packets that are unprotected (e.g., encrypted messages that need to be decrypted, authentication only messages that need the integrity check value (ICV) computed, etc.), congestion or bandwidth expansion may occur due to the insertion of the pause or PFC packet. The post decrypt buffer 310 includes a small amount of buffer to handle this scenario. The buffer is also used for CPU ejection packets as discussed below. The periodic ejection of CPU-bound packets may also create some bandwidth for the insertion of pause or PFC packets. The buffer may also be used as a store-and-forward buffer to perform packet error (e.g., authentication failure, etc.) drops following packet transform at the decrypt packet 309.

In an embodiment, the MACsec core 300 has the ability to internally monitor the flow of packets through the egress pipeline 302 and the ingress pipeline 303. A packet may be captured at any point in the pipelines and sent to the CPU 311. The CPU 311 may evaluate packets internally or send the packets to an external monitor (not shown). For example, a packet travelling through the ingress pipeline 303 may be sent from the ingress parser and classifier 308 to the decrypt packet 309. A copy of the packet or a partial copy of the packet may be sent to the CPU 311 by the ingress parser and classifier 308 as it sends the packet to the decrypt packet 309. The decrypt packet 309 may decrypt the packet and send a copy or partial copy of the packet to the CPU 311 before sending the packet to the post-decrypt buffer 310. This allows the MACsec core 300 to capture any errors such as the decrypt packet 309 failing to decrypt the packet. The CPU 311 can have a before decryption and after decryption failure picture of the packet and can analyze (or an external monitor can analyze) if the cause was an internal error, for example.

3.0. Functional Overview 3.1. Intelligent Error Handling 3.1.1. Error Source Indication—CRC Tunneling and Wire Modes The MACsec core 300 supports two CRC tunneling modes: single CRC and double CRC, and a "wire" mode. In single CRC mode, when sending packets from the host side interface 301 to the line side interface 307, the original CRC from the host (e.g., switch, server, etc.) is removed once the CRC is checked to see that it is a good CRC which means that the packet is good. The egress parser and classifier 304 removes the original CRC and then on transmit after the packet has been transformed and the encrypt packet 306a has encrypted the packet, a new CRC is computed for the encrypted packet and appended to the encrypted packet by the post-encrypt buffer 306b.

In double CRC mode, the original CRC from the switch is preserved, the packet is sent through the MACsec egress pipeline to the encrypt packet 306a to be encrypted. The post-encrypt buffer 306b appends a new CRC to the encrypted packet before transmission into the network via the line side interface 307. Thus, any error originating prior to the arrival to the MACsec core 300 would be captured in the original CRC. Any error originating after the arrival to the MACsec core 300 is captured in an outer CRC (the CRC that the post-encrypt buffer 306b appends). The double CRC mode allows easy diagnosis of what the source of the error was. This comes into play when administrators are trying to debug their system and figure out where the error occurred, e.g., if they have a switch from vendor A and a MACsec core from vendor B, they can easily find out which part of the transmission path caused the error. When the packet is received at a downstream component, both the original and the appended CRCs can be examined to determine where the packet was corrupted, e.g., what could be the possible source of the corruption, etc.

In wire mode or channel bypass mode, the original CRC is preserved with MACsec encryption and security inactive for the particular channel. The essential operational behavior is that packets entering from the host side interface 301 should go out the line side interface 307 intact—as if the entire MACsec core 300 was a wire. The original CRC that arrives from the switch is preserved and, on transmission, the original CRC is sent. Thus, even if the original CRC is bad, it is still propagated through the MACsec core 300 because the MACsec core 300 acts as a wire.

Errors or a corrupted packet may occur in many different scenarios. For example, there can be an issue with the cable during transmission and the CRC will not be valid upon reception. There can be security failures associated with the ICV, SecTag, etc. There can also be internal MACsec core errors where an internal memory inside the MACsec core has an uncorrectable error correction code (ECC) error or there could be a buffer overflow or memory overflow that causes data loss.

3.1.2. CRC Tunneling Mode Examples

Figure 4:
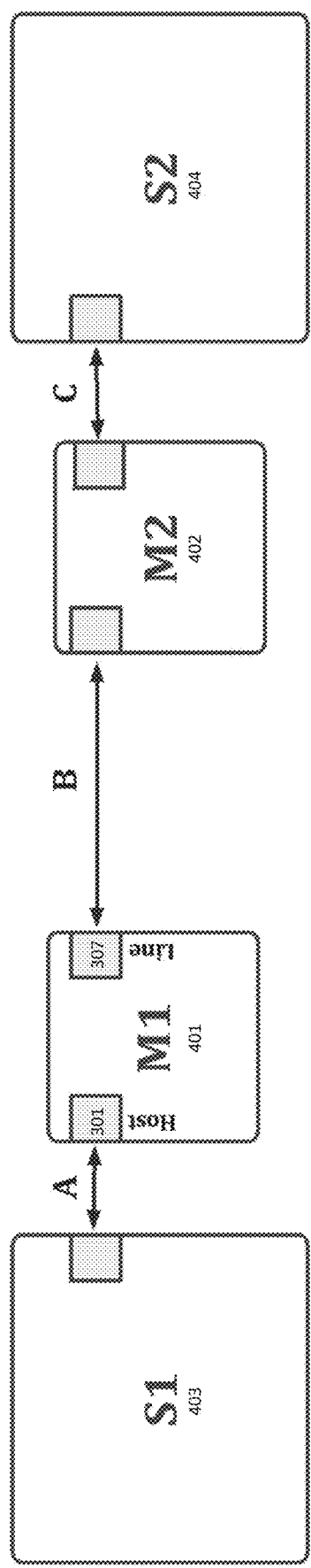
FIG. 4 illustrates a block diagram of MACsec devices connected to switches at their host ports, according to an embodiment.

FIG. 4 illustrates a block diagram of MACsec devices connected to switches at their host ports. Each MACsec device M1 401 and M2 402 implements the MACsec core 300. Note that, although the MACsec devices M1 401 and M2 402 are shown as separate from switches S1 403 and S2 404 in FIG. 4, in an embodiment, the MACsec devices M1 401 and/or M2 402 may be incorporated into the switches S1 403 and/or S2 404, respectively. For example, MACsec device M1 401 may be incorporated into switch S1 403 and/or MACsec device M2 402 may be incorporated into switch S2 404. In this example, M1 401 is communicatively connected through communication link A to S1 403 on the host side interface 401 and communicatively connected through communication link B to M2 402 on the line side interface 307. M2 402 is communicatively connected through communication link C to S2 404 on its host side interface.

In an embodiment, in single CRC mode, in a case where the packets being handled are good packets, S1 403 sends a packet to M1 401 on the host side interface 301. The egress parser and classifier 304 determines that the packet is good and strips the CRC from the packet and encrypt packet 306a encrypts the packet. The post-encrypt buffer 306b appends a new CRC to the packet and sends the packet out its line side interface 307 to M2 402. In the receive context, when M1 401 receives an encrypted packet from M2 402 at its line side interface 307, ingress parser and classifier 308 determines that the packet is a good packet and strips the CRC from the packet. Decrypt packet 309 decrypts the packet, and post decrypt buffer 310 appends a new CRC to the packet and sends the packet to S1 403 via the host side interface 301.

In an embodiment, in single CRC mode, in a case where the packets are error packets, S1 403 sends a packet to M1 401 on the host side interface 301. The egress parser and classifier 304 determines that the packet has an error and strips the CRC from the packet. It then notifies the pre-encrypt buffer 305 that the packet has an error. The packet is not encrypted by the encrypt packet 306a (in cut-through mode, the packet would have been encrypted and started to be sent out the line side interface 307). The post-encrypt buffer 306b appends a new CRC to the packet with (optionally) a stomp code in the CRC indicating that the packet is bad (optionally, a CRC code indicating the source of the error can also be inserted into the CRC) and sends the packet out its line side interface 307 to M2 402. In the receive context, when M1 401 receives an error packet from M2 402 at its line side interface 307, ingress parser and classifier 308 determines that the packet is an error packet and strips the CRC from the packet. Post decrypt buffer 310 appends a new CRC to the packet with (optionally) a stomp code and sends the packet to S1 403 via the host side interface 301.

Figure 5:
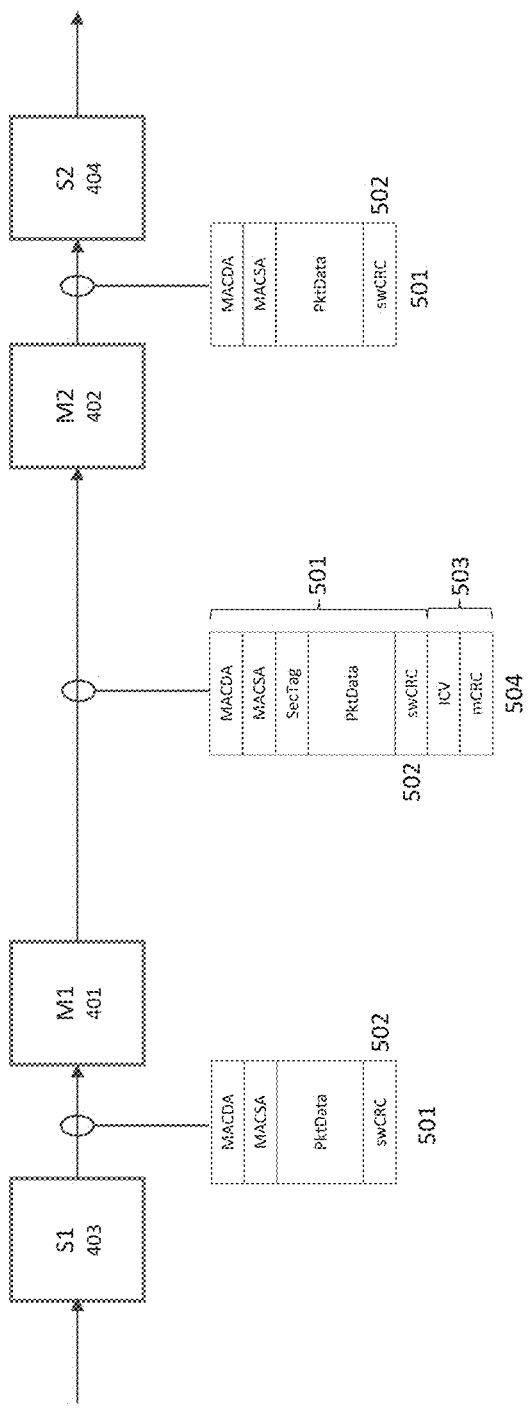
FIG. 5 illustrates a block diagram of MACsec devices connected to switches at their host ports in double CRC mode, according to an embodiment.

FIG. 5 illustrates a block diagram of MACsec devices connected to switches at their host ports in double CRC mode. In an embodiment, in a case where M1 401 handles good packets, S1 403 sends a packet 501 to M1 401 on the host side interface 301. The egress parser and classifier 304 determines that the packet is good and preserves the original CRC (inner CRC 502) in the packet 501. The encrypt packet 306a encrypts the packet, then post-encrypt buffer 306b appends a new CRC and ICV (outer CRC 503) to the packet 501 and sends the resulting packet 504 out its line side interface 307 to M2 402. In the receive context, when M2 402 receives the encrypted packet 504 from M1 401 at its line side interface 307, ingress parser and classifier 308 determines that the packet 504 is a good packet and strips the outer CRC 503 from the packet. Post decrypt buffer 310 decrypts the packet 501 and sends the packet 501 to S2 404 via the host side interface 301. Since the original CRC 502 is tunneled through, if there are data corruptions due to uncorrectable ECC errors inside M1 401, or M2 402, this would be caught at S2 404.

In an embodiment, in double CRC mode, in a case where M1 401 handles packets that are error packets, S1 403 sends a packet 501 to M1 401 on the host side interface 301. The egress parser and classifier 304 determines that the packet 501 has an error, preserves the original CRC (inner CRC 502) in the packet, and notifies the pre-encrypt buffer 305 that the packet has an error. The packet 501 is not encrypted by the encrypt packet 306a. The post-encrypt buffer 306b appends a new outer CRC 503 to the packet with (optionally) a stomp code in the CRC indicating that the packet is bad (optionally, a CRC code indicating the source of the error can also be inserted into the CRC) and sends the packet 504 out its line side interface 307 to M2 402. In a further option, the bad inner CRC 502 is tunneled through and the outer CRC 503 is not stomped. Assuming there are no errors between M1 401 and M2 402, M2 402 detects a good outer CRC 503. This would ensure that M2 402 will advance the replay window and S2 404 will be the one that detects that the packet has a bad inner CRC and can drop the packet. In the receive context, when M2 402 receives the error packet 504 from M1 401 at its line side interface 307, ingress parser and classifier 308 determines that the packet 504 is an error packet and strips the outer CRC 503 from the packet. Post decrypt buffer 310 (optionally) replaces the inner CRC 502 in the packet with a stomp code indicating that an error happened on entry to the network and sends the packet to S2 404 via the host side interface 301. The stomp code could be based on the outer CRC 503 stomp value to convey that the error happened on entry into M1 401 or in M2 402 itself or on corruption of the wire between M1 401 and M2 402.

3.1.3. Wire Mode Examples

Referring again to FIG. 4, in wire mode (channel bypass mode), in a case where M1 401 handles good packets, S1 403 sends a packet to M1 401 on the host side interface 301.

The egress parser and classifier 304 determines that the packet is good and preserves the original CRC in the packet. Post-encrypt buffer 306b sends the packet out its line side interface 307 to M2 502. In the receive context, when M1 401 receives a packet from M2 402 at its line side interface 307, ingress parser and classifier 308 determines that the packet is a good packet and preserves the original CRC in the packet. Post decrypt buffer 310 sends the packet to S1 403 via the host side interface 301.

In wire mode (channel bypass mode), in a case where M1 401 handles packets that are error packets, S1 403 sends a packet to M1 401 on the host side interface 301. The egress parser and classifier 304 determines that the packet has an error and preserves the original CRC in the packet. Post-encrypt buffer 306b sends the packet out its line side interface 307 to M2 402. In the receive context, when M1 401 receives a packet from M2 402 at its line side interface 307, ingress parser and classifier 308 determines that the packet is an error packet and preserves the CRC in the packet. Post decrypt buffer 310 sends the packet to S1 403 via the host side interface 301. S1 can detect that the frame is corrupt and drop the packet.

3.2. Flow Control Management
3.2.1. Encryption Path Bandwidth Expansion Examples In an embodiment, MACSec device M1 401 observes bandwidth expansion while sending traffic from S1 403 to S2 404 whenever:
1) The encryption process can add, for example, up to 32 bytes of encryption header (e.g., ICV, SecTag, etc.).
2) In double CRC mode an additional CRC (e.g., +4 bytes) is appended to the packet.
3) If the CPU in M1 401 periodically injects packets for transmission to S2 404, the CPU injected packet results in additional bytes that must be buffered. If the incoming traffic rate is sufficiently high, then PAUSE or PFC may be needed to manage the bandwidth expansion caused by injecting a CPU packet.

3.2.2. Managing Bandwidth Expansion
3.2.2.1. Host-side IPG Stretching

In an embodiment, the bandwidth expansion can be accounted for at the host side. Host-side (S1 403) can stretch the inter packet gap (IPG) to account for bytes added to packets sent through the line side interface 307 to S2 404. The host side may increase the IPG to account for some or all of the additional bytes added to the packet by the device. This can reduce the rate that flow control messages are transmitted to the host or eliminate them altogether.

3.2.2.2. Pause/PFC Flow Control

The host side IPG stretching is less complicated because there is no need to perform flow control and it is less error prone. However, users typically do not like latency in the data center. A downside to host side IPG stretching is that the link can be underutilized when, for example, only 50% of outgoing traffic needs to be protected, because the IPG is stretched for all packets. On the other hand, if close to 100% of traffic is being protected, then there is negligible underutilization of the link and latency would be the primary downside. In an embodiment, the system provides a pause or PFC flow control option where the post-encrypt buffer 306b accumulation and the pre-encrypt buffer 305 levels are monitored due to the bandwidth expansion. An Ethernet flow control message, either pause or PFC, depending on what is supported, is sent to S1 403 whenever congestion is detected in post-encrypt buffer 306b or the pre-encrypt buffer 305. In an embodiment, the MACsec device supports end-to-end flow control where S1 403 and S2 404 are communicating with each other and telling the other when it is congested. For example, S2 404 can tell S1 403 to not send any more traffic. That message needs to be propagated from S2 404 to S1 403, but if, at the same time, if S1 403 is receiving a pause message from S2 404, M1 401 is sending a pause message, S1 403 is going to get confused. The post decrypt buffer 310 extracts the pause message coming from S2 404 and the flow control manager 312 merges it with the internal congestion state from the pre-encrypt buffer 305, in order to send one coherent message to S1 403 and maintain and ensure that the flow control messaging between S2 404 and S1 403 is coherent.

In an embodiment, the MACsec core 300 supports two different variations for handling pause or PFC frames: double CRC and single CRC. In an example, in double CRC mode, S2 404 sends a PFC (or pause) frame to M2 403. M2 403 receives the PFC frame and adds an outer CRC to the packet. The packet is not encrypted, in contrast to other packets, and traverses the full data path as normal packets do. M2 403 sends the packet to M1 402. When M1 402 receives the packet, it strips the outer CRC from the packet and sends the packet to S1 401. S1 401 receives the original PFC frame.

Alternatively, S2 404 sends a PFC (or pause) frame to M2 403. M2 403 receives the PFC frame and adds an outer CRC to the packet. The packet is not encrypted, in contrast to other packets, and traverses the full data path as normal packets do. M2 403 sends the packet to M1 402. When M1 402 receives the packet, it strips the outer CRC from the packet and uses the CRC to validate the packet. M1 402 then strips the inner CRC, uses the inner CRC to check if the PFC message is valid, parses the PFC frame, resolves the priorities to flow control, and updates the flow control manager state to the flow control manager 312, which sends the combined (merged) state to S1 401.

In another embodiment, when in single CRC PFC (or pause) frame mode, PFC frames are left alone and non-PFC frames have outer CRCs appended to them as discussed herein. M2 403 receives the PFC frame from S2 404 and generates a new PFC message with a single CRC to send to M1 402. M1 402 receives the PFC message and sends the PFC message to S1 401 without stripping the CRC. S1 401 receives the PFC frame as it was sent by S2 404.

Alternatively, when M1 402 is merging pause states, M2 403 receives the PFC frame from S2 404 and generates a new PFC message with a single CRC to send to M1 402. This makes it easier for M1 402 to parse the PFC message and merge the pause states. M1 402 does not have to strip an outer CRC, then use that CRC to validate the packet, and then strip the inner CRC and use the inner CRC to check if the PFC message is valid. Instead, M1 402 can strip the CRC, use the CRC to check if the PFC message is valid, parse the PFC frame, extract the flow control state, provide the congestion state and the extracted flow control state to the flow control manager 312, which sends the combined state to S1 401.

In an embodiment, each MACsec device in a network can process and generate new pause or PFC frames at each hop. The pause or PFC frame is processed upon reception by the MACsec device and does not traverse the data path as normal frames. The MACsec device interprets the frame and forwards the state from host side interface-to-line side interface side and a new pause or PFC frame is generated at the line side interface. The new frame only has a single CRC.

In an embodiment, the MACsec device can act in a message forwarding mode where the MACsec core never stops traffic in response to receiving a pause or PFC frame. Instead, the MACsec core forwards the pause or PFC frame state as it was received to the host or, alternatively, the MACsec core can merge the pause or PFC frame state with the PEB FC state and send the merged state to the host.

3.2.2.3. End-To-End Flow Control

In an embodiment, in single CRC mode, end-to-end flow control can be achieved using host-side stretching. In this mode, end-to-end pause or PFC framing may be enabled between S1 401 and S2 404. In this example, M1 402 sends a pause or PFC frame received from S1 401 to S2 404 as standard data frames. M1 402 does not detect or interpret pause or PFC frames received from S1 401 (destined for S2 404). Malformed pause or PFC frames (e.g., incorrect DA, Ethertype, etc.) may be sent to S2 404. Pause or PFC frames may be encrypted by M1 402 and decrypted by M2 403. M1 402 may receive pause or PFC frames from S2 404 to S1 401 as standard data frames. M1 402 does not detect or interpret pause or PFC frames received from S2 404 (destined for S1 401). Encrypted pause or PFC frames may be received from M2 403 and decrypted by M1 402, then sent to S1 401. Malformed PAUSE/PFC frames may be sent to S1 401 without error. Note that in the double CRC case, M1 402 treats the pause and PFC frames as normal data frames.

In an embodiment, in single CRC mode, end-to-end pause or PFC framing is not enabled between S1 401 and S2 402, and pause is enabled from M1 402 to S1 401 only. Note that a pause frame is discussed in this example, but a PFC frame operation is similar. M1 402 generates a pause frame (XOFF) to S1 401 when congestion is detected by the pre-encrypt buffer 305. In this case, congestion occurs due to encryption path bandwidth expansion. Buffer usage is monitored and congestion is detected in the pre-encrypt buffer 305 (per channel). Congestion is determined whenever the configured XOFF threshold is exceeded. A congestion indication (XOFF) is sent by the pre-encrypt buffer 305 to the flow control manager 312. XOFF flow control status is then sent, iteratively for each channel (0 . . . 7) by the flow control manager 312 to the host side interface 301. A background process scans flow control manager 312 and sends a pause status for each channel sequentially, for example, scan order: Channel ID 0→Channel ID 1→Channel ID 2 . . . . The pause frame is generated with a pause_timer>0 and is transmitted by the host side interface 301 to S1 401.

M1 402 generates a pause frame (XON) to S1 401 when congestion is no longer present in the pre-encrypt buffer 305. Buffer usage monitoring resolves when congestion no longer exists, in this case, when buffer usage in the pre-encrypt buffer 305 falls below a configured XON threshold for the channel. Optionally or additionally, the threshold condition can be when the channel has been in XOFF state for a required min-xoff-timer duration. pre-encrypt buffer 305 sends an XON indication to the flow control manager 312. Per channel congestion state for each MACsec channel ID is mapped to host-side PIC port ID by the flow control manager 312. XON flow control status is sent, iteratively, to each port for the host side interface 301. A background process scans the flow control manager 312 and sends a pause status for each channel sequentially. When the pause time expires a pause frame is generated with pause_timer=0 is transmitted by the host side interface 301 to S1 401. Note that in the double CRC case, double CRC is not applied to pause frames.

3.2.2.4. Asymmetric PFC

In general, the ethernet TX interface, e.g., M2 403, normally generates a PFC frame for lossless priorities only where the priority vector enable bits are only set for lossless priorities. In an asymmetric PFC condition, even though the sender, e.g., S2 404, and the receiver, e.g., S1 401, may agree to priority flow control, the ethernet RX interface, e.g., M1 402, honors the PFC frame on all priorities even though it sees that the flow control information is for some priorities. The RX interface stops transmission on any priority for which both: Priority Vector Enable [i] is set and Time [i]>0. This results in transmission inhibited for both lossless and lossy priorities at the receiver, e.g., S1 401.

3.2.2.5. Flow Control State Merging

In an embodiment, in single CRC mode, pause or PFC frames and end-to-end flow control are enabled. In the S1 401 to S2 404 direction, both end-to-end pause or PFC framing is enabled between S1 401 and S2 404. Flow control issued by M1 402 to S1 401 is enabled if congestion detected in M1 402 is due to bandwidth expansion. For S1 401 to S2 404 flow control, M1 402 sends received ethernet flow control frames from S1 401 to S2 404 as standard data frames. M1 402 does not detect or interpret pause or PFC frames received from S1 401 (for S2 404). Malformed pause or PFC frames (e.g., incorrect DA, Ethertype, etc.) may be sent to S2 404 without an error indication. Pause or PFC frames may be encrypted by M1 402 and decrypted by M2 403. In the S2 404 to S1 401 direction, M1 402 receives pause or PFC frames from S2 404 (for S1 401). M1 402 detects and interprets received pause or PFC frames, then drops the original pause or PFC frames. Flow control state is extracted from the pause or PFC frames, stored, and updated by M1 402. Malformed pause or PFC frames are dropped and not processed by M1 402. The processed flow control state is tracked using the flow control manager 312. Concurrently, M1 402 detects internal congestion in the pre-encrypt buffer 305 caused by bandwidth expansion. M1 402 monitors internal buffer usage and detects congestion due to bandwidth expansion. The pre-encrypt buffer 305 sends congestion status (XOFF/XON) to flow control manager 312 for merging with extracted flow control timer values.

In an embodiment, M1 402 generates Ethernet flow control frames based on a merged flow control status. The flow control manager 312 combines pre-encrypt buffer 305 flow control state and the received flow control state, then signals the host side interface 301 to generate the flow control message. The flow control manager 312 merges flow control states: 1) to XOFF whenever either the pre-encrypt buffer 305 or S2 404 indicate congestion, or 2) XON whenever both pre-encrypt buffer 305 and S2 404 are uncongested. Optionally, M1 can generate the flow control message on all priorities after merging flow control states if and only if pre-encrypt buffer 305 is congested and PFC is enabled. Asymmetric PFC support is required by S1 401 if PFC is used by S2 404. Congestion is detected by pre-encrypt buffer 305 by monitoring buffer usage on a per channel queue basis. Buffer use count is maintained for each channel queue by pre-encrypt buffer 305. If the buffer-use-count[channel]>xoff-threshold[channel], then congestion (XOFF) is indicated by pre-encrypt buffer 305 to flow control manager 312.

The congestion state (XOFF) for the channel is cleared when the channel buffer usage falls below a configured XON threshold (buffer-use-count[channel]<=xon-threshold[channel]). Optionally or additionally, when a channel has been in the XOFF state for at least a configured min-xoff-timer period of time (may be specified per channel). The pre-encrypt buffer 305 sends the congestion status per channel queue to the flow control manager 312.

In an embodiment, the flow control manager 312 receives the pause or PFC state from the line side interface 307 per channel. The flow control manager 312 maps the received pause or PFC state to a channel ID and stores the pause or PFC state on a per channel basis. The flow control manager 312 receives the channel flow control state from the pre-encrypt buffer 305. The channel flow control state is provided on a per channel basis. Channel flow control may be set on every clock cycle and may not be stored by the flow control manager 312 (e.g., level signal). The flow control manager 312 merges the flow control state received from the pre-encrypt buffer 305 and the line side interface 307. The flow control manager 312 ensures that the state is consistent before sending the flow control state to the host side interface 301. The flow control manager 312 then sends the merged flow control state to the host side interface 301 using a background process. The background process can scan each channel flow control state sequentially (e.g., chid 0→chid 1→chid 2 . . . ) or any other configured order. The background process maps channel ID to host interface port ID.

Flow control events are triggered based on a change in either the pre-encrypt buffer 305 or the line side interface 307 flow control state. Message generation to the host side interface 301 may be triggered on the state transitions.

3.3. CPU Injection/Ejection with Bandwidth Expansion Management 3.3.1. CPU Injection In an embodiment, injection of packets from the CPU 311 may be supported in the egress pipeline 302 as shown in FIG. 3. CPU injection can be used to support security and configuration protocols, as well as other functions. The injection of CPU packets results in bandwidth expansion and potential congestion, so backpressure may be required from the pre-encrypt buffer 305 to manage transient congestion caused by CPU packet injection traffic. A pause or PFC state may be sent to the host side interface 301 periodically to manage transient congestion based on the CPU packet injection rate.

3.3.2. CPU Ejection

In an embodiment, ejection of packets from traffic passing from the line side interface 307 to the host side interface 301 direction can be sent to the CPU 311 or, additionally or optionally, a subsystem of the post decrypt buffer 310 or system external to the MACsec core 300 (e.g., a switch that the MACsec core is part of, a system outside of the switch, a connection to the host connected to the host side interface 301, etc.). A classifier identifies packets of interest to be sent to CPU 311. Packets can be redirected or mirrored to the CPU 311, this can be configured using a classifier rule that the ingress parser and classifier 308 refers to when processing packets. The classifier rules filter packets being sent to the CPU 311 based on the results of ingress parser and classifier 308 processing. The following are examples of classifier rules:

1) All packets are eligible. All of the packets identified by the classifier are sent to the CPU 311, regardless of packet error status.
2) Only good packets are eligible. Only packets identified by the classifier that have no errors are sent to CPU 311.
3) Only errored packets are eligible. Only packets identified by the classifier that have errors are sent to CPU 311. For example, if the CPU 311 only wants to see packets that failed security checks for visibility and debug.
4) Packets captured after MACsec processing. If a packet is decrypted or transformed, CPU 311 sees the decrypted/transformed packet. Packets going to the CPU 311 can be placed in CPU queues (not shown) per channel. Each queue is determined by a classifier policy and can be one packet deep or more. Packets going to the CPU 311 may be truncated if they exceed a defined size. Packets may not be written to the CPU queue if that queue is full.

3.3.3. CPU Redirect Vs Mirror

In an embodiment, the classifier identifies packets of interest to be redirected or mirrored to the CPU 311. In redirect to the CPU mode, the original copy of the packet does not go out on the host side interface 301. The packet only goes to the CPU 311 (or other subsystem or system as discussed above). In mirror to CPU mode, the original packet is processed normally, and the packet can be dropped after it has been sent to the CPU 311 or sent to both the host side interface 301 and to the CPU 311.

4.0. Implementation Mechanism—Hardware Overview

According to one embodiment, the techniques described herein are implemented by one or more special-purpose computing devices. The special-purpose computing devices may be desktop computer systems, portable computer systems, handheld devices, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques. Such special-purpose computing devices may also combine custom hard-wired logic, ASICs, FPGAs, or other circuitry with custom programming to accomplish the techniques.

Though certain foregoing techniques are described with respect to a hardware implementation, which provides a number of advantages in certain embodiments, it will also be recognized that, in other embodiments, the foregoing techniques may still provide certain advantages when performed partially or wholly in software. Accordingly, in such an embodiment, a suitable implementing apparatus comprises a general-purpose hardware processor and is configured to perform any of the foregoing methods by executing program instructions in firmware, memory, other storage, or a combination thereof.

Figure 6:
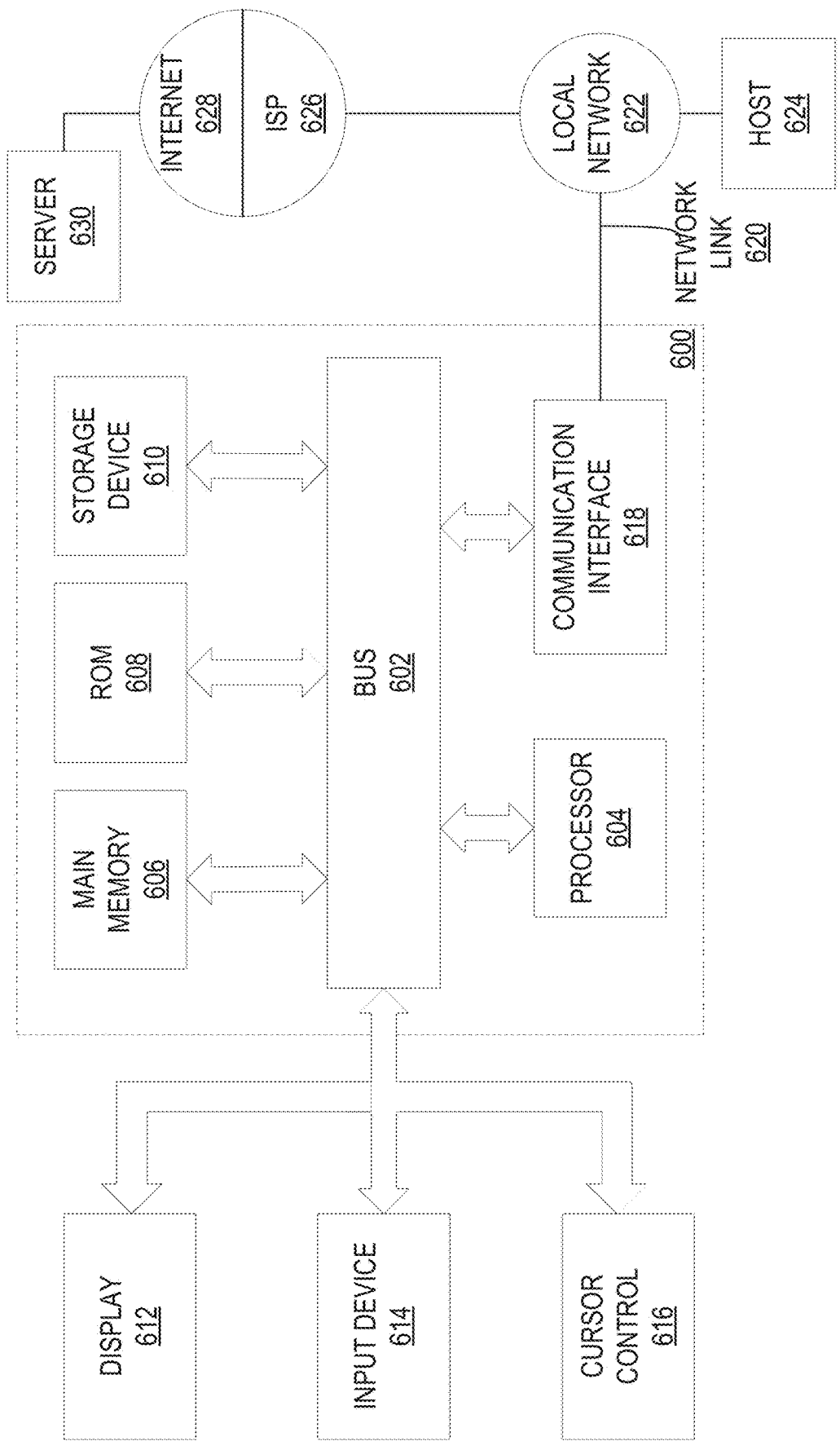
FIG. 6 is a block diagram that illustrates an example computer system that may be utilized in implementing the above-described techniques.

FIG. 6 is a block diagram that illustrates an example computer system 600 that may be utilized in implementing the above-described techniques, according to an embodiment. Computer system 600 may be, for example, a desktop computing device, laptop computing device, tablet, smartphone, server appliance, computing mainframe, multimedia device, handheld device, networking apparatus, or any other suitable device. In an embodiment, FIG. 6 constitutes a different view of the devices and systems described in previous sections.

Computer system 600 may include one or more ASICs, FPGAs, or other specialized circuitry 603 for implementing program logic as described herein. For example, circuitry 603 may include fixed and/or configurable hardware logic blocks for implementing some or all of the described techniques, input/output (I/O) blocks, hardware registers or other embedded memory resources such as random-access memory (RAM) for storing various data, and so forth. The logic blocks may include, for example, arrangements of logic gates, flip-flops, multiplexers, and so forth, configured to generate an output signals based on logic operations performed on input signals.

Additionally, and/or instead, computer system 600 may include one or more hardware processors 604 configured to execute software-based instructions. Computer system 600 may also include one or more busses 602 or other communication mechanism for communicating information. Busses 602 may include various internal and/or external components, including, without limitation, internal processor or memory busses, a Serial ATA bus, a PCI Express bus, a Universal Serial Bus, a HyperTransport bus, an InfiniBand bus, and/or any other suitable wired or wireless communication channel.

Computer system 600 also includes one or more memories 606, such as a RAM, hardware registers, or other dynamic or volatile storage device for storing data units to be processed by the one or more ASICs, FPGAs, or other specialized circuitry 603. Memory 606 may also or instead be used for storing information and instructions to be executed by processor 604. Memory 606 may be directly connected or embedded within circuitry 603 or a processor 604. Or, memory 606 may be coupled to and accessed via bus 602. Memory 606 also may be used for storing temporary variables, data units describing rules or policies, or other intermediate information during execution of program logic or instructions.

Computer system 600 further includes one or more read only memories (ROM) 608 or other static storage devices coupled to bus 602 for storing static information and instructions for processor 604. One or more storage devices 610, such as a solid-state drive (SSD), magnetic disk, optical disk, or other suitable non-volatile storage device, may optionally be provided and coupled to bus 602 for storing information and instructions.

A computer system 600 may also include, in an embodiment, one or more communication interfaces 618 coupled to bus 602. A communication interface 618 provides a data communication coupling, typically two-way, to a network link 620 that is connected to a local network 622. For example, a communication interface 618 may be an integrated services digital network (ISDN) card, cable modem, satellite modem, or a modem to provide a data communication connection to a corresponding type of telephone line. As another example, the one or more communication interfaces 618 may include a local area network (LAN) card to provide a data communication connection to a compatible LAN. As yet another example, the one or more communication interfaces 618 may include a wireless network interface controller, such as an 802.11-based controller, Bluetooth controller, Long Term Evolution (LTE) modem, and/or other types of wireless interfaces. In any such implementation, communication interface 618 sends and receives electrical, electromagnetic, or optical signals that carry digital data streams representing various types of information.

Network link 620 typically provides data communication through one or more networks to other data devices. For example, network link 620 may provide a connection through local network 622 to a host computer 624 or to data equipment operated by a Service Provider 626. Service Provider 626, which may for example be an Internet Service Provider (ISP), in turn provides data communication services through a wide area network, such as the world-wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

In an embodiment, computer system 600 may send and receive data units through the network(s), network link 620, and communication interface 618. In some embodiments, this data may be data units that the computer system 600 has been asked to process and, if necessary, redirect to other computer systems via a suitable network link 620. In other embodiments, this data may be instructions for implementing various processes related to the described techniques. For instance, in the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution. As another example, information received via a network link 620 may be interpreted and/or processed by a software component of the computer system 600, such as a web browser, application, or server, which in turn issues instructions based thereon to a processor 604, possibly via an operating system and/or other intermediate layers of software components.

Computer system 600 may optionally be coupled via bus 602 to one or more displays 612 for presenting information to a computer user. For instance, computer system 600 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 612 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 612.

One or more input devices 614 are optionally coupled to bus 602 for communicating information and command selections to processor 604. One example of an input device 614 is a keyboard, including alphanumeric and other keys. Another type of user input device 614 is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. Yet other examples of suitable input devices 614 include a touch-screen panel affixed to a display 612, cameras, microphones, accelerometers, motion detectors, and/or other sensors. In an embodiment, a network-based input device 614 may be utilized. In such an embodiment, user input and/or other information or commands may be relayed via routers and/or switches on a Local Area Network (LAN) or other suitable shared network, or via a peer-to-peer network, from the input device 614 to a network link 620 on the computer system 600.

As discussed, computer system 600 may implement techniques described herein using customized hard-wired logic, one or more ASICs or FPGAs 603, firmware and/or program logic, which in combination with the computer system causes or programs computer system 600 to be a special-purpose machine. According to one embodiment, however, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media may also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and use a modem to send the instructions over a network, such as a cable network or cellular network, as modulated signals. A modem local to computer system 600 may receive the data on the network and demodulate the signal to decode the transmitted instructions. Appropriate circuitry may then place the data on bus 602. Bus 602 carries the data to main memory 606, from which processor 604 retrieves and executes the instructions. The instructions received by main memory 606 may optionally be stored on storage device 610 either before or after execution by processor 604.

5.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the inventive subject matter have been described with reference to numerous specific details that may vary from implementation to implementation. Thus, the sole and exclusive indicator of what is the inventive subject matter, and is intended to be the inventive subject matter, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:
1. A network apparatus, comprising:
a media access control security (MACsec) layer configured to receive and transmit data packets from a host interface and a line interface, the MACsec layer comprising:
a pre-encryption packet frame buffer configured to buffer packet frames from data packets received from the host interface prior to encryption;
an encryption packet frame buffer configured to buffer encrypted data packets after encryption;
a buffer monitor configured to monitor buffer levels of the pre-encryption packet frame buffer and the encryption packet frame buffer;
a host flow controller configured to send flow control messages to a computing system communicatively connected to the host interface;
wherein the buffer monitor sends a signal to the host flow controller logic upon detecting that the encryption packet frame buffer level is scheduled to reach a threshold congestion level due to bandwidth expansion caused by encrypting one or more packet frames from the pre-encryption packet frame buffer;
wherein, in response to the signal received from the buffer monitor logic, the host flow controller sends a flow control message indicating a pause to the computing system via the host interface.

2. The network apparatus of claim 1, the MACsec layer further comprising:
a packet encrypter configured to encrypt data in a data packet from the pre-encryption packet frame buffer, the packet encrypter adds an encryption header to the encrypted data packet before storing the encrypted data packet in the encryption packet frame buffer, the encrypted data packet is sent from the encryption packet frame buffer out to a network via the line interface;

wherein the encryption header added to the encrypted data packet increases congestion in the encryption packet frame buffer.

3. The network apparatus of claim 1, the MACsec layer further comprising:
a packet encrypter configured to add an additional CRC to a data packet from the pre-encryption packet frame buffer while encrypting the data packet, the packet encryption logic calculates and adds an additional CRC to the encrypted data packet before sending the encrypted data packet out to a network via the line interface;
wherein the additional CRC added to the encrypted data packet increases congestion in the encryption packet frame buffer.

4. The network apparatus of claim 1, the MACsec layer further comprising:
a packet inserter configured to insert an internal control packet into the pre-encryption packet frame buffer;
wherein the insertion of the internal control packet into the pre-encryption packet frame buffer increases congestion in the pre-encryption packet frame buffer.

5. The network apparatus of claim 1, wherein the host flow controller monitors the signal from the buffer monitor that indicates the pre-encryption packet frame buffer level and the encryption packet frame buffer level, wherein in response to the pre-encryption packet frame buffer level and the encryption packet frame buffer level being below the threshold congestion level, the host flow controller sends a second flow control message indicating a start to the computing system via the host interface.

6. The network apparatus of claim 1, the MACsec layer further comprising:
a line interface packet receiver configured to receive network packets from a network via the line interface;
a packet decrypter configured to decrypt received network packets and classify the received network packets, the packet decrypter notifies the host flow controller when a flow control packet is received;
wherein the host flow controller merges the signal received from the buffer monitor and a flow control state extracted from the received flow control packet into the flow control message and sends the flow control message to the computing system via the host interface.

7. The network apparatus of claim 1, the MACsec layer further comprising:
a line interface packet receiver configured to receive network packets from a network via the line interface;
a packet decrypter configured to decrypt received network packets and classify the received network packets, the decrypt packet logic notifies the host flow control logic when a flow control packet is received;
wherein the host flow controller merges the signal received from the buffer monitor and a flow control state extracted from the received flow control packet into a merged flow control message and sends the merged flow control message indicating a pause when the signal indicates that the pre-encryption packet frame buffer level or the encryption packet frame buffer level has reached the threshold congestion level, or the flow control state indicates a pause.

8. The network apparatus of claim 1, the MACsec layer further comprising:
a line interface packet receiver configured to receive network packets from a network via the line interface;
a packet decrypter configured to decrypt received network packets and classify the received network packets, the decrypt packet logic notifies the host flow control logic when a flow control packet is received;
wherein the host flow controller merges the signal received from the buffer monitor and a flow control state extracted from the received flow control packet into a merged flow control message and sends the merged flow control message indicating a start to the computing system via the host interface when the signal indicates that the pre-encryption packet frame buffer level and the encryption packet frame buffer level are below the threshold congestion level, and the flow control state indicates a start.

9. The network apparatus of claim 1, wherein the buffer monitor monitors buffer levels of the pre-encryption packet frame buffer and the encryption packet frame buffer on a per channel basis.

10. A method comprising:
receiving, at a media access control security (MACsec) layer in a network device, data packets from a host interface;
storing packet frames from the data packets in a pre-encryption packet frame buffer, the pre-encryption packet frame buffer storing the packet frames from the data packets prior to encryption;
storing encrypted data packets after for encryption in an encryption packet frame buffer;
monitoring buffer levels of the pre-encryption packet frame buffer and the encryption packet frame buffer;
in response to an indication that encryption packet frame buffer level is scheduled to reach a threshold congestion level due to bandwidth expansion caused by encrypting one or more packet frames from the pre-encryption packet frame buffer, sending a flow control message indicating a pause to a computing system communicatively connected to the host interface.

11. The method of claim 10, further comprising:
encrypting data in a data packet from the pre-encryption packet frame buffer, an encryption header is added to the encrypted data packet before storing the encrypted data packet in the encryption packet frame buffer, the encrypted data packet is sent from the encryption packet frame buffer out to a network via the line interface;
wherein the encryption header added to the encrypted data packet increases congestion in the encryption packet frame buffer.

12. The method of claim 10, further comprising:
calculating an additional CRC for a data packet from the pre-encryption packet frame buffer while encrypting the data packet;
adding the additional CRC to the encrypted data packet before storing the encrypted data packet in the encryption packet frame buffer, the encrypted data packet is sent from the encryption packet frame buffer out to a network via the line interface;
wherein the additional CRC added to the encrypted data packet increases congestion in the encryption packet frame buffer.

13. The method of claim 10, further comprising:
inserting an internal control packet into the pre-encryption packet frame buffer;
wherein the insertion of the internal control packet into the pre-encryption packet frame buffer increases congestion in the pre-encryption packet frame buffer.

14. The method of claim 10, further comprising:
monitoring the pre-encryption packet frame buffer level and the encryption packet frame buffer level;
in response to the pre-encryption packet frame buffer level and the encryption packet frame buffer level being below the threshold congestion level, sending a second flow control message indicating a start to the computing system via the host interface.

15. The method of claim 10, further comprising:
receiving network packets from a network via the line interface;
decrypting the received network packets;
wherein upon receipt of a flow control packet, merging a status of the buffer levels of the pre-encryption packet frame buffer and the encryption packet frame buffer with a flow control state extracted from the received flow control packet into a merged flow control message;
sending the merged flow control message to the computing system via the host interface.

16. The method of claim 10, the MACsec layer further comprising:
receiving network packets from a network via the line interface;
decrypting the received network packets;
wherein upon receipt of a flow control packet among the received network packets, merging a status of the buffer levels of the pre-encryption packet frame buffer and the encryption packet frame buffer with a flow control state extracted from the received flow control packet into a merged flow control message;
sending the merged flow control message to the computing system via the host interface indicating a pause when the pre-encryption packet frame buffer level or the encryption packet frame buffer level has reached the threshold congestion level, or the flow control state indicates a pause.

17. The method of claim 10, the MACsec layer further comprising:
receiving network packets from a network via the line interface;
decrypting the received network packets;
wherein upon receipt of a flow control packet among the received network packets, merging a status of the buffer levels of the pre-encryption packet frame buffer and the encryption packet frame buffer with a flow control state extracted from the received flow control packet into a merged flow control message;
sending the merged flow control message to the computing system via the host interface indicating a start when the pre-encryption packet frame buffer level and the encryption packet frame buffer level are below the threshold congestion level, and the flow control state indicates a start.

18. The method of claim 10, wherein the monitoring buffer levels monitors buffer levels of the pre-encryption packet frame buffer and the encryption packet frame buffer on a per channel basis.

19. One or more non-transitory computer-readable storage media, storing one or more sequences of instructions, which when executed by one or more processors cause performance of:
receiving, at a media access control security (MACsec) layer in a network device, data packets from a host interface;
storing packet frames from the data packets in a pre-encryption packet frame buffer, the pre-encryption packet frame buffer storing the packet frames from the data packets prior to encryption;
storing encrypted data packets after for encryption in an encryption packet frame buffer;
monitoring buffer levels of the pre-encryption packet frame buffer and the encryption packet frame buffer;
in response to an indication that the encryption packet frame buffer level is scheduled to reach a threshold congestion level due to bandwidth expansion caused by encrypting one or more packet frames from the pre-encryption packet frame buffer, sending a flow control message indicating a pause to a computing system communicatively connected to the host interface.

20. The one or more non-transitory computer-readable storage media of claim 19, further comprising:
encrypting data in a data packet from the pre-encryption packet frame buffer, an encryption header is added to the encrypted data packet before storing the encrypted data packet in the encryption packet frame buffer, the encrypted data packet is sent from the encryption packet frame buffer out to a network via the line interface;
wherein the encryption header added to the encrypted data packet increases congestion in the encryption packet frame buffer.

* * * * *